United States Patent
Rawa et al.

(10) Patent No.: US 11,121,643 B1
(45) Date of Patent: *Sep. 14, 2021

(54) ACTIVE NEUTRAL POINT CLAMPED INVERTER WITH A PLURALITY OF BOOST LEVELS

(71) Applicant: King Abdulaziz University, Jeddah (SA)

(72) Inventors: Muhyaddin Rawa, Jeddah (SA); Hussain Bassi, Jeddah (SA); Saad Mekhilef, Jeddah (SA); Marif Daula Siddique, Jeddah (SA); Noraisyah Binti Mohamed Shah, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/206,539

(22) Filed: Mar. 19, 2021

Related U.S. Application Data

(63) Continuation of application No. 17/095,977, filed on Nov. 12, 2020.

(51) Int. Cl.
| | |
|---|---|
| *H02M 7/487* | (2007.01) |
| *H02M 7/5395* | (2006.01) |
| *H02M 1/00* | (2006.01) |
| *H02M 7/483* | (2007.01) |

(52) U.S. Cl.
CPC ......... *H02M 7/487* (2013.01); *H02M 7/5395* (2013.01); *H02M 1/0003* (2021.05); *H02M 7/4835* (2021.05)

(58) Field of Classification Search
CPC .. H02M 7/487; H02M 7/4833; H02M 7/4835; H02M 7/5395; H02M 1/0095; H02M 1/0003
See application file for complete search history.

(56) References Cited

U.S. PATENT DOCUMENTS

| | | | | | |
|---|---|---|---|---|---|
| 4,855,893 | A | * | 8/1989 | Kratz | H02M 7/487 363/136 |
| 4,881,159 | A | * | 11/1989 | Holtz | H02M 1/34 363/58 |
| 5,946,208 | A | * | 8/1999 | Yamamoto | A61B 6/488 363/132 |

(Continued)

FOREIGN PATENT DOCUMENTS

BR 102014023057-2 A2 7/2016

OTHER PUBLICATIONS

Zeng, et al. ; Switched-Capacitor Based Active-Neutral-Point-Clamped Seven-Level Inverter with Natural Balance and Boost Ability.

(Continued)

*Primary Examiner* — Yusef A Ahmed
(74) *Attorney, Agent, or Firm* — Oblon, McClelland, Maier & Neustadt, L.L.P.

(57) ABSTRACT

An 11 level boost active neutral point clamped (BANPC) inverter using four capacitors and a single DC voltage source to generate eleven voltage levels at load terminals with a voltage gain of 2.5. A minimum of switching elements are used. Gate pulses for the switches are generated using nearest level control pulse width modulation (NLC-PWM). The capacitors of the 11 level boost active neutral point clamped inverter are self-balancing.

4 Claims, 19 Drawing Sheets

(56) References Cited

U.S. PATENT DOCUMENTS

| | | | | |
|---|---|---|---|---|
| 5,953,222 | A * | 9/1999 | Mizutani | H03K 17/567 363/56.05 |
| 8,867,248 | B2 * | 10/2014 | Wang | H02M 7/487 363/132 |
| 8,934,275 | B2 * | 1/2015 | Temesi | H03K 17/08128 363/131 |
| 9,705,313 | B2 * | 7/2017 | Yamada | H02M 7/537 |
| 10,277,144 | B2 * | 4/2019 | Soeiro | H02M 7/487 |
| 10,903,758 | B2 * | 1/2021 | Fu | H02M 7/487 |
| 10,965,221 | B1 * | 3/2021 | Bassi | H02M 7/483 |
| 10,978,957 | B2 * | 4/2021 | Zhang | H02M 1/08 |
| 2004/0124805 | A1 * | 7/2004 | Edwards | H02M 7/487 318/700 |
| 2011/0141779 | A1 * | 6/2011 | Joseph | H02M 7/487 363/95 |
| 2013/0014384 | A1 * | 1/2013 | Xue | H02M 7/49 29/825 |
| 2013/0272045 | A1 * | 10/2013 | Soeiro | H02M 7/487 363/131 |
| 2014/0313802 | A1 * | 10/2014 | Kuwahara | H02M 7/537 363/131 |
| 2014/0376294 | A1 * | 12/2014 | Hu | H02M 7/487 363/131 |
| 2015/0124506 | A1 * | 5/2015 | Sahoo | H02P 27/08 363/126 |
| 2015/0155770 | A1 * | 6/2015 | Ying | H02M 7/217 307/52 |
| 2015/0263644 | A1 * | 9/2015 | Fu | H02M 7/487 363/95 |
| 2016/0028224 | A1 * | 1/2016 | Yamada | H02H 9/02 363/56.11 |
| 2016/0043659 | A1 * | 2/2016 | Xu | H02M 1/088 363/131 |
| 2016/0352251 | A1 * | 12/2016 | Li | H02M 7/487 |
| 2017/0012552 | A1 * | 1/2017 | Gan | H02M 7/12 |
| 2017/0104424 | A1 * | 4/2017 | Shen | H02M 1/44 |
| 2018/0062537 | A1 * | 3/2018 | Wang | H02J 3/383 |
| 2018/0145606 | A1 * | 5/2018 | Wu | H02M 7/487 |
| 2018/0159519 | A1 * | 6/2018 | Chen | H02M 7/483 |
| 2018/0269803 | A1 * | 9/2018 | Soeiro | H02M 3/158 |
| 2018/0309384 | A1 * | 10/2018 | Wang | H02M 7/487 |
| 2019/0058416 | A1 * | 2/2019 | Wang | H02M 7/487 |
| 2019/0238062 | A1 * | 8/2019 | Lu | H03K 17/122 |
| 2020/0021203 | A1 * | 1/2020 | Xie | H02M 7/487 |
| 2020/0212806 | A1 * | 7/2020 | Levi | H02M 7/483 |

OTHER PUBLICATIONS

Abarzadeh, et al. ; An Improved Active-Neutral-Point-Clamped Converter with New Modulation Method for Ground Power Unit Application ; IEEE Transactions on Industrial Electronics ; 2018 ; 11 Pages.

Mouser Electronics ; ON Semiconductor FGHL50T65SQDT IGBT; https://www.mouser.com/new/on-semiconductor/on-semi-fghl50t65sqdt-igbt/ ; 2 Pages.

* cited by examiner

ACTIVE NEUTRAL POINT CLAMPED INVERTER WITH A PLURALITY OF BOOST LEVELS

CROSS-REFERENCE TO RELATED APPLICATIONS

The present application is a continuation of Ser. No. 17/095,977, pending, which has a filing date of Nov. 12, 2020.

BACKGROUND

Technical Field

The present disclosure is directed to an eleven level boost active neutral point clamped (BANPC) inverter.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Multilevel boost inverters have application in power electronics fields, such as electric vehicle rechargeable batteries and solar power converters. A multilevel inverter (a circuit that converts DC to AC) works on the principle of switching between different levels of DC voltage. The output is thus not a sineshaped AC wave but a pattern of high frequency rectangular pulses that are made to resemble the sine wave as accurately as possible. The advantages of multilevel inverters are lower voltage stress and higher efficiency. However, the high number of switching components and the use of many DC voltage sources and capacitors increases the costs and adversely affects the power efficiency.

Seven level boosting active neutral point clamped (7L-BANPC) inverters with self-voltage balancing capability and voltage gain of $1.5V_{dc}$ have been described. (See: Sathik, M.; Sandeep, N.; Blaabj erg, F., "High Gain Active Neutral Point Clamped Seven-Level Self-Voltage Balancing Inverter", Power Electronics IET, vol. 13, no. 9, pp. 1919-1924, 2020; Zeng, J.; Win, W. Liu, J, "Switched-capacitor based active-neutral point-clamped seven-level inverter with natural balance and boost ability", IEEE Access, Vol. 7, p. 126889-126896, Jul. 8, 2019, each incorporated herein by reference in its entirety). However, neither of these inverters can generate eleven voltage levels or generate voltage gain higher than $1.5V_{dc}$.

A nine-level boost inverter using a single output capacitor which has a voltage gain of $\pm 2V_{dc}$ using nearest level control PWM (NLC-PWM) has been used as a low frequency technique for the gate pulse generation has been described. (See: M. D. Siddique, Mekhilef, S; Shah, N.; Ali, J.; Meraj, M.; Kqbal, A.; Al-Hitmi, M., "A New Single Phase Single Switched-Capacitor Based Nine-Level Boost Inverter Topology With Reduced Switch Count and Voltage Stress", IEEE Access, Vol. 7, pp. 174178-174188, 2019, doi: 10.1109/ACCESS.2019.2957180, incorporated herein by reference in its entirety). However, the inverter of Siddique et al. cannot generate eleven voltage levels nor does it have a gain higher than $2.0V_{dc}$.

An 11-level active-neutral-point-clamped (11L-IANPC) converter has been described which has a voltage gain of 1.25E, where E is the magnitude of the voltage of the voltage supply. (See: Abarzadeh, M.; Al-Haddad, K., "An improved active-neutral-point-clamped converter with new modulation method for ground power unit application", IEEE Transactions on Industrial Electronics, vol. 66, no. 1, pp. 203-214, January 2019, doi: 10.1109/TIE.2018.2826484, incorporated herein by reference in its entirety). However, Abarzadeh et al. uses a 5-L ANPC paired with an additional switched voltage supply to achieve the 11 levels, which increases the power usage of the circuit. The Abarzadeh inverter cannot generate a voltage gain of greater than 1.25E and the circuit topology is not the same as the circuit topology of the present disclosure.

Accordingly, it is one object of the present disclosure to provide methods and systems for an eleven level boost ANPC (11L-BANPC) circuit topology using a single DC voltage supply, four capacitors and a minimum of switching elements, and which generates an eleven level output with high voltage gain.

SUMMARY

In an exemplary embodiment, an 11 level boost active neutral point clamped (BANPC) inverter is described, comprising an DC link stage including a DC voltage source, a first capacitor and a second capacitor, a switching stage connected in parallel with the DC link stage, the switching stage including a first plurality of switches and a first plurality of diodes, an output stage connected in parallel with the switching stage, the output stage including a third capacitor, a fourth capacitor and a second plurality of switches, a positive load terminal connected to the output stage and a negative load terminal connected to ground, a control circuit operatively connected to the DC voltage source, the first, second, third and fourth capacitors and the first and second plurality of switches, wherein the control circuit is configured to selectively actuate the first and second plurality of switches to balance the first and second capacitors and provide an 11 level output voltage across the load terminals.

In another exemplary embodiment, a method for generating 11 output voltage levels with an 11 level boost active neutral point clamped (BANPC) inverter is described, comprising charging, by a DC voltage source, a first and second series connected capacitor of a DC link stage of the 11 level BANPC inverter, generating, by a control circuit, a plurality of gate pulses using nearest level control pulse width modulation (NLC-PWM), applying the gate pulses to a first and second plurality of switches, wherein the gate pulses balance each of the first and second series connected capacitors to have a same voltage magnitude and wherein applying the gate pulses to the first and second plurality of switches selectively connects a third capacitor and a fourth capacitor of an output stage of the 11 level BANPC inverter to the DC voltage source and generates an 11 level output voltage at the positive load terminal.

In another exemplary embodiment, a non-transitory computer readable medium having instructions stored therein that, when executed by one or more processors, cause the one or more processors to perform a method for generating 11 output voltage levels with an 11 level boost active neutral point clamped (BANPC) inverter is described, comprising charging, by a DC voltage source, a first and second series connected capacitor of a DC link stage of the 11 level BANPC inverter, generating, by a control circuit, a plurality of gate pulses using nearest level control pulse width modulation (NLC-PWM), applying the gate pulses to a first and second plurality of switches, wherein the gate pulses balance each of the first and second series connected capacitors to have a same voltage magnitude and wherein applying the gate pulses to the first and second plurality of switches selectively connects a third capacitor and a fourth capacitor of an output stage of the 11 level BANPC inverter to the DC voltage source and generates an 11 level output voltage at the positive load terminal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
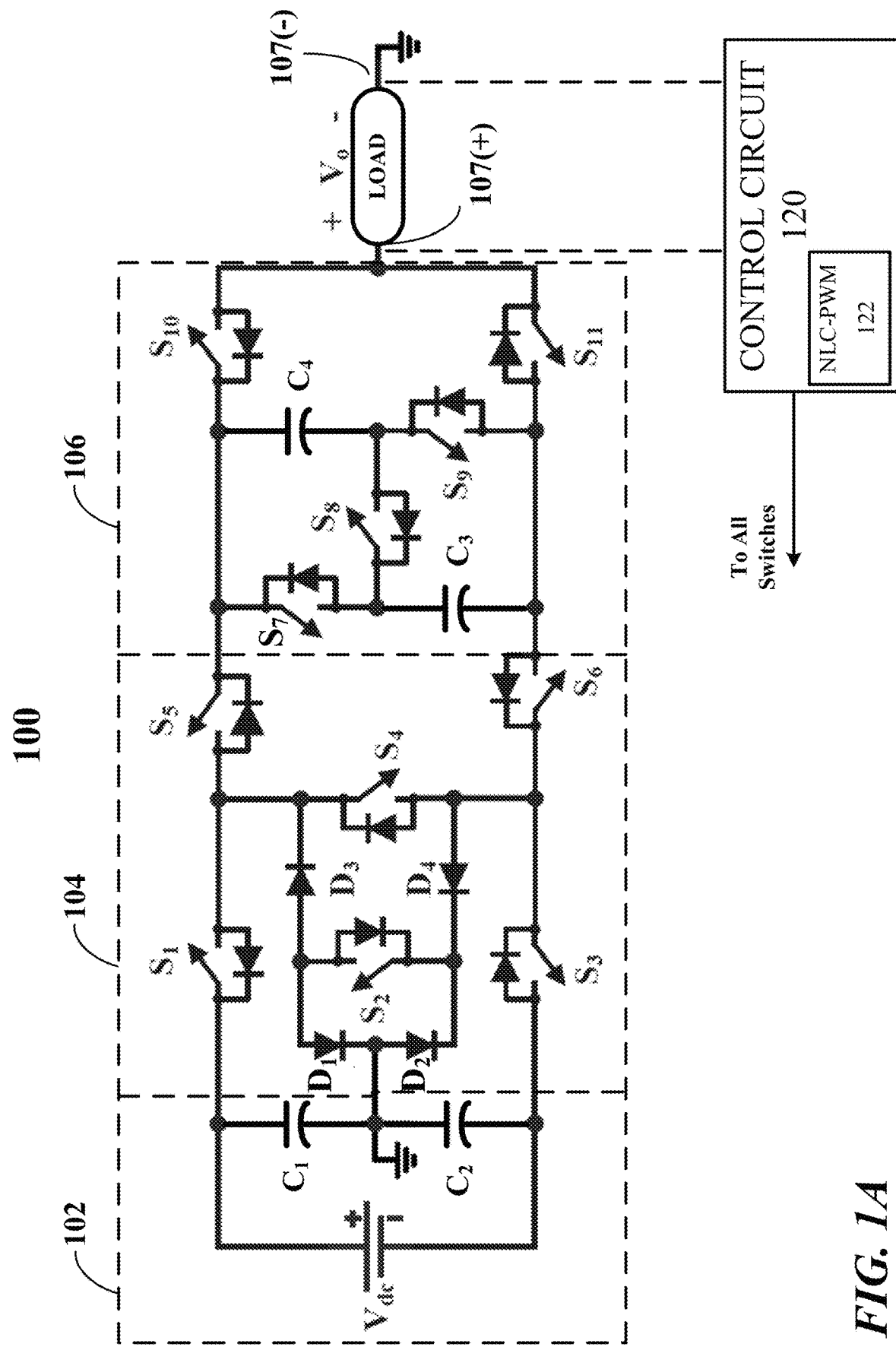
FIG. 1A is a circuit diagram illustrating the circuit topology of the 11L-BANPC.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an 11 level boost active neutral point clamped (BANPC) inverter, a method for generating 11 output voltage levels with an 11 level boost active neutral point clamped (BANPC) inverter and a non-transitory computer readable medium having instructions stored therein that, when executed by one or more processors, cause the one or more processors to perform a method for generating 11 output voltage levels with an 11 level boost active neutral point clamped (BANPC) inverter.

Aspects of the present disclosure describe an eleven level boost active neutral point clamped (11-L BANPC) inverter circuit which uses a single DC voltage source and which can generate eleven voltage levels at an output.

The advantages of the 11 level BANPC are:
 i. A single dc voltage source is used.
 ii. The voltage gain is 2.5 ($V_{in}$:$V_{out}$=2.5).
 iii. 11 levels are generated using 11 unidirectional switches and four diodes.
 iv. Four capacitors are used (two of $0.5V_{dc}$, and two of $V_{dc}$).
 v. Inherent polarity reversal capability.
 vi. Maximum voltage stress across any switch is equal to the input DC voltage source.
 vii. Self-voltage balancing of the capacitors.

The circuit structure of the 11 level boost ANPC (11L-BANPC) is illustrated in FIG. 1A. The circuit includes three stages: a DC link stage 102, a switching stage 104 and an output stage 106. The circuit includes 11 unidirectional switches (unidirectional voltage blocking capability and bidirectional current flow) and four diodes. The two capacitors $C_1$ and $C_2$ of the DC link stage 102 are directly connected to input voltage source $V_{dc}$ which forms the DC link voltage. These two capacitors split the input voltage into equal halves, i.e., $0.5V_{dc}$. The other two capacitors $C_3$ and $C_4$ form the switched capacitor unit of the output stage of the present disclosure. These two capacitors $C_3$ and $C_4$ are charged up to the input voltage source, i.e., $V_{dc}$, in accordance with gate pulses selectively applied to the gates of the switches. Both capacitors can be operated in parallel during the discharging mode at the voltage levels of $\pm V_{dc}$ and $\pm 1.5V_{dc}$. The switched capacitor units formed by these two capacitors give the boosting feature of the 11L-BANPC.

A control circuit 120 generates the gate pulses to control the states of the switches (ON or OFF) and monitors the voltage across the load, $V_o$. The control circuit is connected at individual outputs (not shown for the sake of clarity) to the gate contacts of each switch. The control circuit may also monitor the capacitor voltages. The control circuit may include a processor, such as a microprocessor or microcontroller circuit, connected to memory, such as RAM, ROM, EEPROM, and/or FLASH, and connected to interface circuitry in order to control the switching states. The control circuit 120 may also include specialized circuits implemented on, for example, a field programmable gate array (FPGA) and/or an application specific integrated circuit (ASIC) in order to effect control of the switching states. The control circuit 120 may also include discrete circuit components (transistors, capacitors, resistors, logic gats, etc.) in order to implement the control functionality. Portions of the functionality of the control circuit 120 may also be implemented as software stored in the aforementioned memory and executing on the aforementioned processor. The control circuit may also be co-located with the other circuits in the multilevel inverter or may be located remotely. As such, the specific implementation of the control circuit 120 is not limiting upon the advancements described in the present disclosure.

Figure 1B:
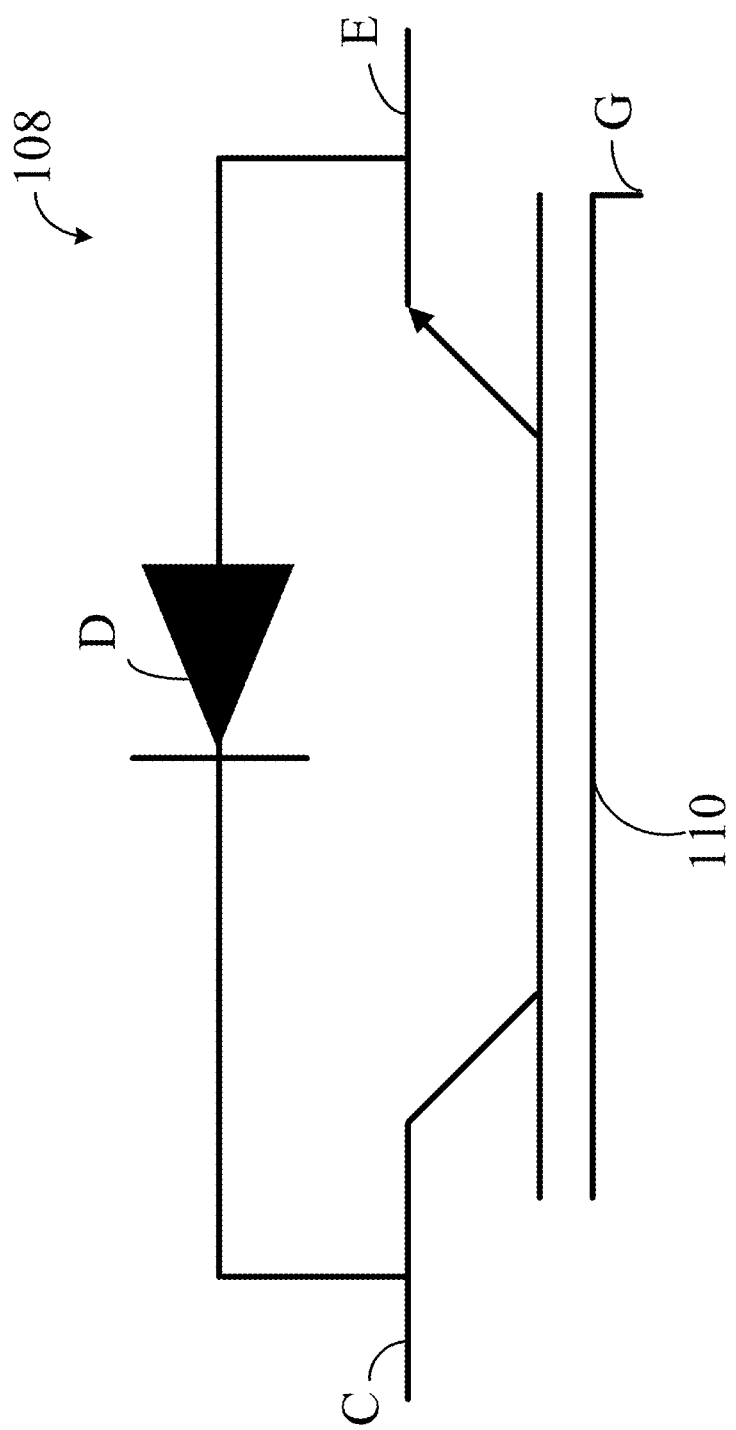
FIG. 1B illustrates the switches used in the circuit of FIG. 1A.

FIG. 1B illustrates a switch 108 including a transistor 110 and an antiparallel diode, D. The transistor has a collector, C, an emitter, E and a gate contact. The diode is connected between the collector and emitter so that the flow of current through the diode (from the emitter to the collector) is antiparallel to the flow of current in the transistor from the collector to the emitter.

The switches of FIG. 1A-FIG. 2F may be transistors, such as bipolar transistors, insulated gate bipolar transistors (IGBTs), junction field effect transistors (JFETs), metal oxide field effect transistors (MOSFETs), or thyristors. Each transistor switch is antiparallel to a diode. Preferably the switches are insulated gate bipolar transistors (IGBTs).

An insulated-gate bipolar transistor (IGBT) is a three-terminal power semiconductor device primarily used as an electronic switch which combines high efficiency and fast switching. It consists of four alternating layers (P-N-P-N) that are controlled by a metal-oxide-semiconductor (MOS) gate structure. In a non-limiting example, an IGBT with an antiparallel diode may be an FGHL50T65SQDT IGBT available from Mouser Electronics, 1000 North Main Street, Mansfield, Tex., U.S.A.

The switching table for the 11L-BANPC is shown in Table 1.

TABLE 1

Switching States of the 11L-BANPC

| ROW | S1 | S2 | S3 | S4 | S5 | S6 | S7 | S8 | S9 | S10 | S11 | Vo | VC3 | VC4 |
|---|---|---|---|---|---|---|---|---|---|---|---|---|---|---|
| 1 | 1 | 0 | 0 | 1 | 0 | 1 | 0 | 1 | 0 | 1 | 0 | 2.5Vdc | D | D |
| 2 | 0 | 1 | 0 | 1 | 0 | 1 | 0 | 1 | 0 | 1 | 0 | 2Vdc | D | D |
| 3 | 1 | 0 | 0 | 1 | 0 | 1 | 1 | 0 | 1 | 1 | 0 | 1.5Vdc | D | D |
| 4 | 0 | 1 | 0 | 1 | 0 | 1 | 1 | 0 | 1 | 1 | 0 | Vdc | D | D |
| 5 | 1 | 0 | 1 | 0 | 1 | 1 | 1 | 0 | 1 | 1 | 0 | 0.5Vdc | C | C |
| 6 | 0 | 1 | 0 | 1 | 0 | 1 | 0 | 0 | 0 | 0 | 1 | 0 | — | — |
| 7 | 1 | 0 | 1 | 0 | 1 | 1 | 1 | 0 | 1 | 0 | 1 | −0.5Vdc | C | C |
| 8 | 0 | 1 | 0 | 1 | 1 | 0 | 1 | 0 | 1 | 0 | 1 | −Vdc | D | D |
| 9 | 0 | 0 | 1 | 1 | 1 | 0 | 1 | 0 | 1 | 0 | 1 | −1.5Vdc | D | D |
| 10 | 0 | 1 | 0 | 1 | 1 | 0 | 0 | 1 | 0 | 0 | 1 | −2Vdc | D | D |
| 11 | 0 | 0 | 1 | 1 | 1 | 0 | 0 | 1 | 0 | 0 | 1 | −2.5Vdc | D | D |

In Table 1, "1" represents the ON state or closed of a switch, "0" represents the OFF or open state of a switch, "C" represents the capacitor is charging, "D" represents that the capacitor is discharging, and "-" represents that the capacitor is not changing state.

Operation of the circuit of FIG. 1A is shown in more detail by the switching paths for the voltage states in the positive half cycle of FIG. 2A-2F which coincide with rows 1-6 in Table 1. The direction of current flow for each switch is shown by the arrow on each switch.

Each capacitor is an electrolytic capacitor, which is a polarized capacitor whose anode or positive plate is made of a metal that forms an insulating oxide layer through anodization. This oxide layer acts as the dielectric of the capacitor. A solid, liquid, or gel electrolyte covers the surface of this oxide layer, serving as the cathode or negative plate of the capacitor. Due to their very thin dielectric oxide layer and enlarged anode surface, electrolytic capacitors have a much higher capacitance-voltage (CV) product per unit volume than ceramic capacitors or film capacitors, and so can have large capacitance values. There are three families of electrolytic capacitor: aluminum electrolytic capacitors, tantalum electrolytic capacitors, and niobium electrolytic capacitors, any of which may be used as the capacitors of the present disclosure.

The large capacitance of electrolytic capacitors makes them particularly suitable for passing or bypassing low-frequency signals, and for storing large amounts of energy. They are widely used for decoupling or noise filtering in power supplies and DC link circuits for variable-frequency drives, for coupling signals between amplifier stages, and storing energy as in a flashlamp.

Electrolytic capacitors are polarized components due to their asymmetrical construction and must be operated with a higher voltage (ie, more positive) on the anode than on the cathode at all times. For this reason the anode terminal is marked with a plus sign and the cathode with a minus sign. Applying a reverse polarity voltage, or a voltage exceeding the maximum rated working voltage of as little as 1 or 1.5 volts, can destroy the dielectric and thus the capacitor. Therefore, the link capacitors of the present disclosure must be balanced for proper operation.

Each diode is a rectifier diode, which is a two-lead semiconductor that allows current to pass in only one direction. Generally, a p-n junction rectifier diode is formed by joining together n-type and p-type semiconductor materials. The p-type side is called the anode and the n-type side is called the cathode. The rectifier diode conducts electric current in only one direction, from the anode to the cathode. The "anode" end has a positive charge relative to the negatively charged "cathode" end and the direction of (positive) current flow for each diode is from the large side (anode) of the triangle of the circuit symbol to the point (cathode) of the triangle. The diodes D1-D4 and the antiparallel diodes of the switches may be the same or different types of diodes and may have the same or different current thresholds.

Figure 2A:
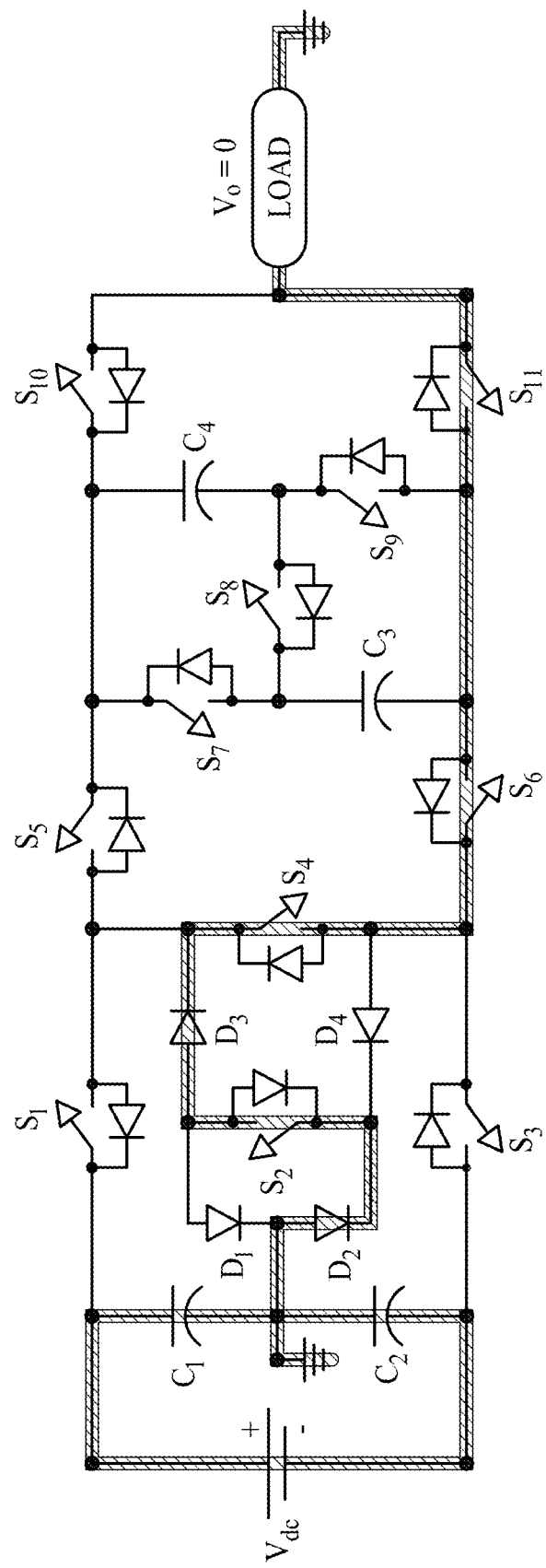
FIG. 2A illustrates the switching pattern of the circuit of FIG. 1 for a voltage level of $V_o=0$.

FIG. 2A shows the switching path which provides zero voltage at the load. The voltage at the common terminal of capacitors $C_1$ and $C_2$ should be zero, as the capacitors are charged and balanced and the common point is grounded. The current from the positive battery voltage terminal is blocked as $S_1$ is OFF and its diode blocks the positive current flow from the positive $V_{dc}$ terminal and the positive terminal of $C_1$. The current from the negative $V_{dc}$ terminal is blocked as $S_3$ is OFF, and the diode of $S_3$ will not pass the negative current flow, as shown by direction of the diode. Any voltage spikes or residual voltage due to unbalanced capacitor voltages or imperfect grounding travels the path of least resistance through diode $D_2$, switch $S_2$, which is ON, diode $D_3$, switch $S_4$, which is ON and switch $S_6$, which is ON. Switch $S_{11}$ is ON, but its diode direction is such that unilateral flow may pass to the load. Capacitors $C_3$ and $C_4$ do not change state, as they are disconnected from the current path. For balanced capacitors $C_1$ and $C_2$, there should be no voltage across the load. Thus, monitoring the load voltage by the control circuit can be used as an indication of a circuit fault, as the voltage across the load should be zero if the capacitors $C_1$ and $C_2$ are balanced.

Figure 2B:
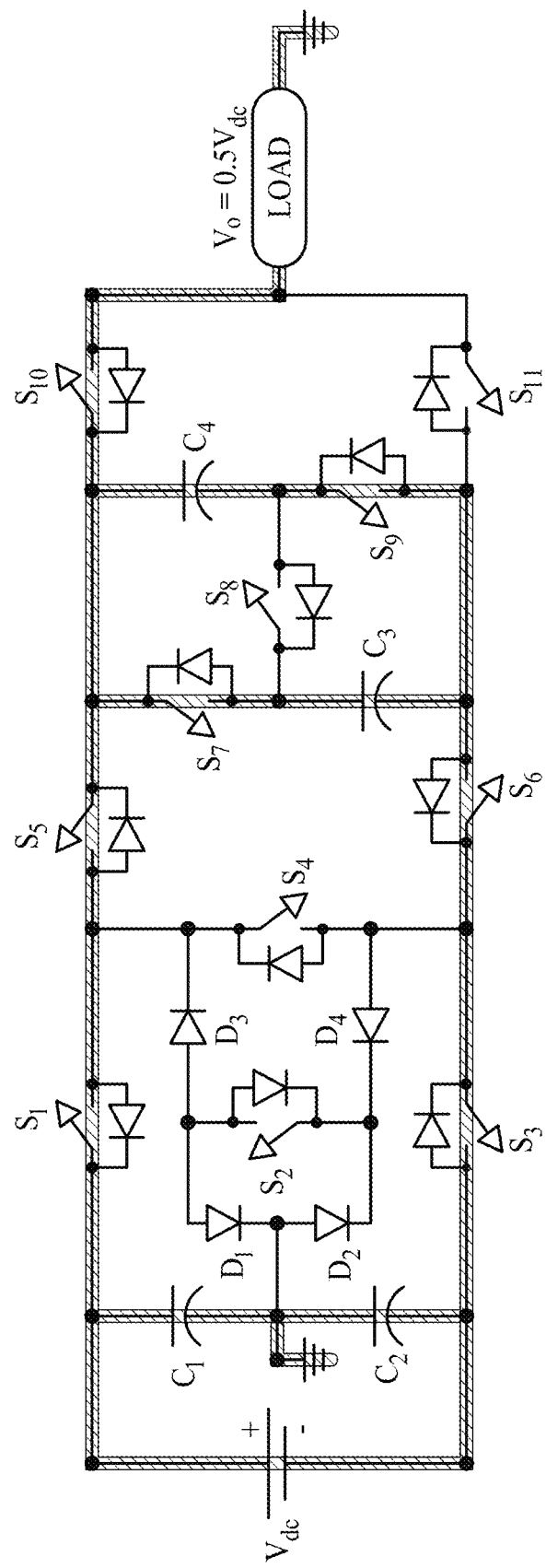
FIG. 2B illustrates the switching pattern of the circuit of FIG. 1 for a voltage level of $V_o=0.5V_{dc}$.

In FIG. 2B, switches $S_1$, $S_5$ and $S_{10}$ are ON, thus the voltage $V_{dc}$ on the positive terminal of the voltage supply is passed through $S_1$, through the diode of $S_5$ and to the common positive terminals of $C_3$ and $C_4$ and charges these capacitors each to $V_{dc}$. Since the switches $S_2$ and $S_4$ are OFF, $C_1$ charges to $0.5V_{dc}$ and $C_2$ charges to $-0.5V_{dc}$. $S_3$ and $S_6$ are ON, so the negative terminal of $C_2$ is at V=0. Switches $S_7$ and $S_9$ are ON, so the capacitors $C_3$ and $C_4$ are each charging, using the $V_{dc}$ voltage. Thus, the voltage output is the same as the voltage on $C_1$, which is $0.5V_{dc}$.

Figure 2C:
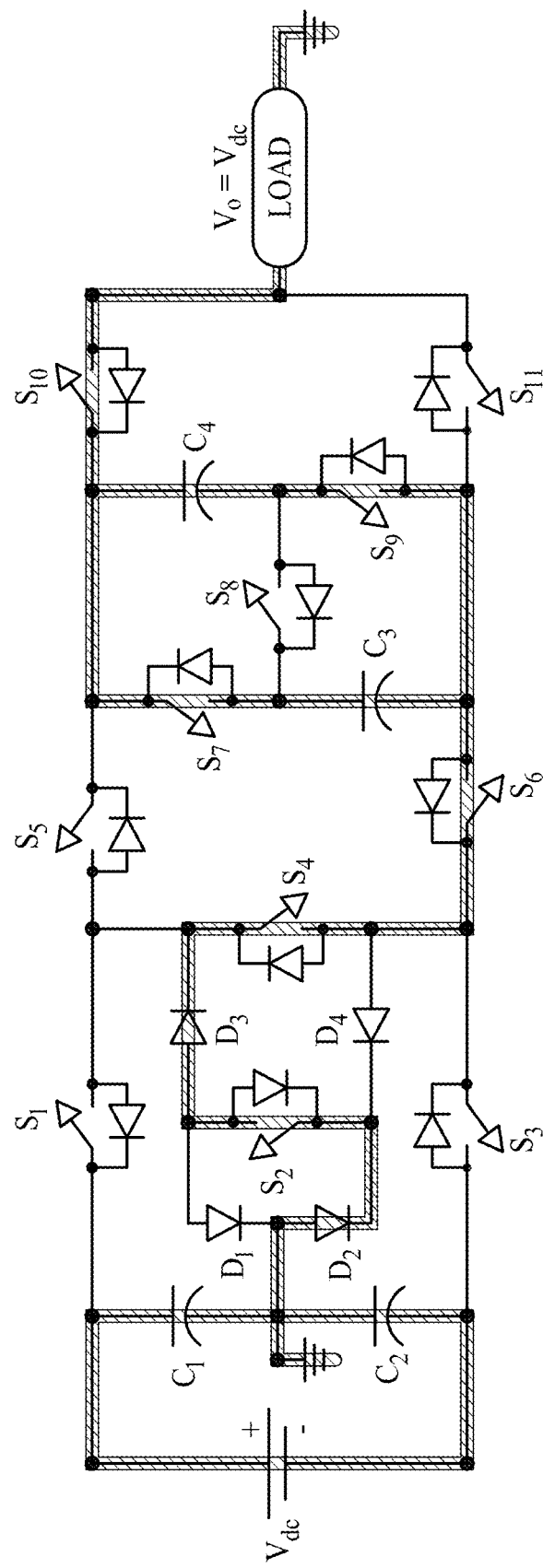
FIG. 2C illustrates the switching pattern of the circuit of FIG. 1 for a voltage level of $V_o=V_{dc}$.

In FIG. 2C, the ground is connected through $D_2$, $S_2$, $D_3$, $S_4$ and $S_3$ to the negative terminal of $C_3$ and through $S_9$ to the negative terminal of $C_4$. $S_7$ is ON, so $C_3$ and $C_4$ are in parallel. As they were charged in FIG. 2B and $S_{10}$ is open, these capacitors can now discharge through the load and the load voltage is the parallel voltage of 1.0 volts of $C_3$ and $C_4$.

Figure 2D:
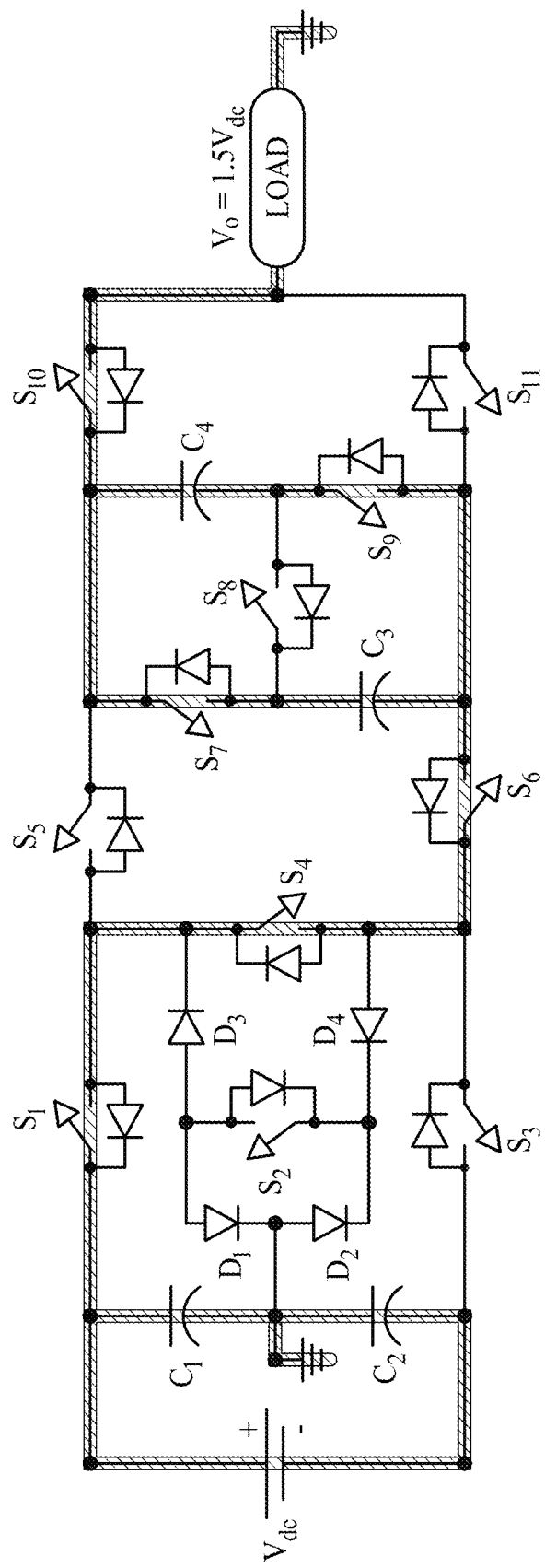
FIG. 2D illustrates the switching pattern of the circuit of FIG. 1 for a voltage level of $V_o=1.5V_{dc}$.

In FIG. 2D, $V_{dc}$ charges $C_1$ to $0.5V_{dc}$ and $C_3$ and $C_4$ to $1.0V_{dc}$. The voltages on $C_1$ and $V_{dc}$ are connected through switches $S_1$, $S_4$, $S_6$, $S_9$, to $C_4$ and through $S_7$ to discharge $C_3$ and $C_4$, which are in parallel, thus providing $1.0V_{dc}$ through switch $S_{10}$ to the load. The voltage from $C_1$ of 0.5 volts adds to the load voltage, since capacitors $C_3$ and $C_4$ cannot charge higher than 1.0 volts, thus the voltage across the load is $1.5V_{dc}$.

Figure 2E:
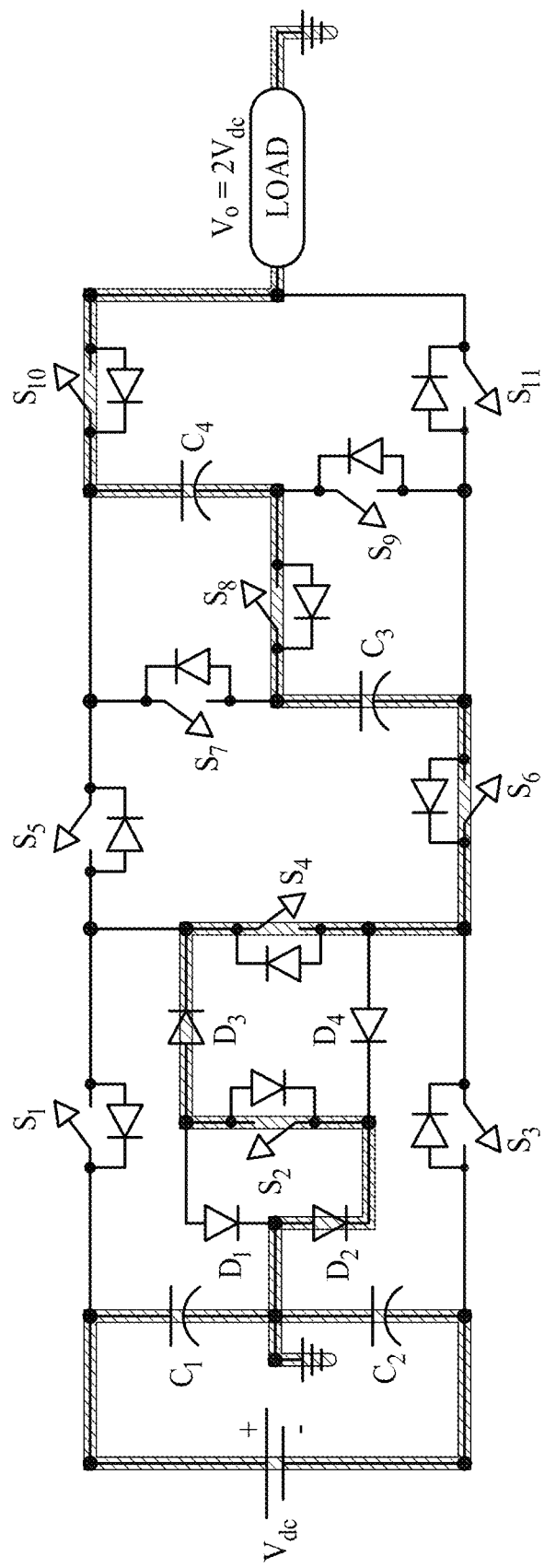
FIG. 2E illustrates the switching pattern of the circuit of FIG. 1 for a voltage level of $V_o=2V_{dc}$.

In FIG. 2E, $C_1$, $C_2$ are balanced at the grounding point and $C_3$ and $C_4$ are fully charged to $1.0V_{dc}$. The ground is connected through $D_2$, $S_2$, $D_3$, $S_4$ and $S_6$ to the negative terminal of $C_3$. Since $S_8$ is ON, $C_3$ and $C_4$ are in series, thus their voltages add to $2V_{dc}$, which discharges through switch $S_{10}$ to the load, thus, the voltage across the load is $2V_{dc}$.

Figure 2F:
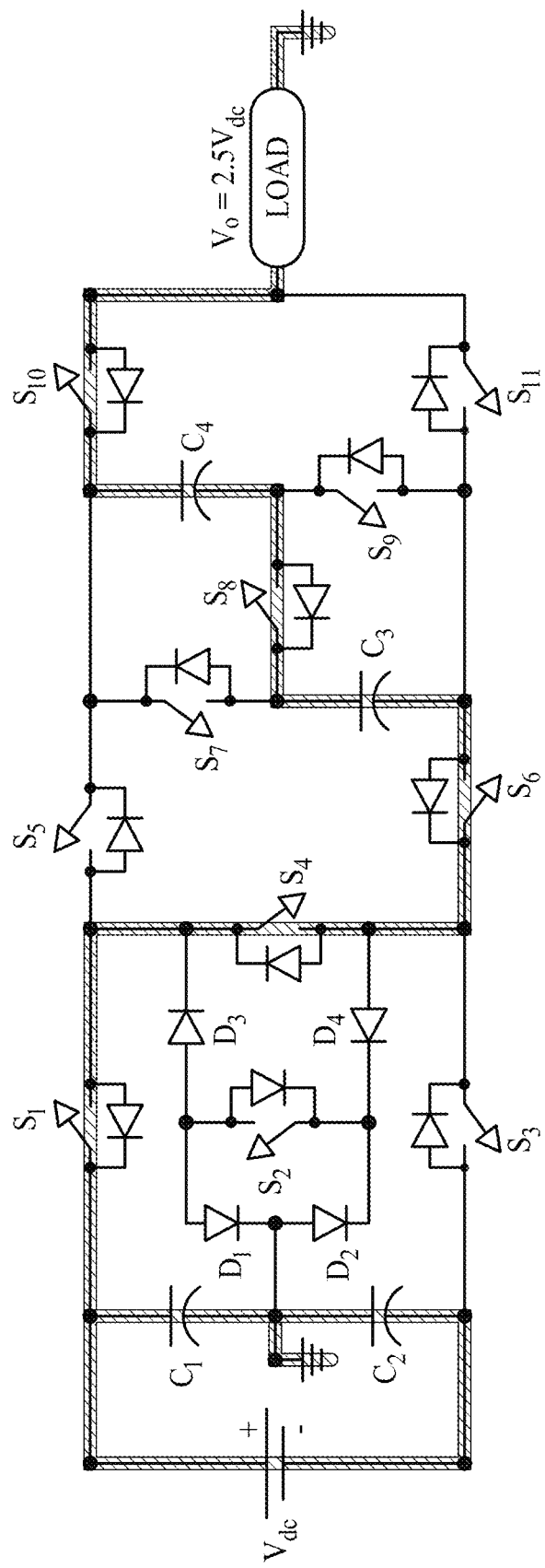
FIG. 2F illustrates the switching pattern of the circuit of FIG. 1 for a voltage level of (f) $V_o=2.5V_{dc}$.

In FIG. 2F, capacitors $C_1$ and $C_2$ are charged to $0.5V_{dc}$ and capacitors $C_3$ and $C_4$ are fully charged as an initial state. When switches $S_1$, $S_4$, $S_6$, $S_8$ and $S_{10}$ are turned on, the voltage on $C_1$ is added to the series voltages of $1.0V_{dc}$ each on $C_3$ and $C_4$ which are discharged to the load. Thus, the load voltage is $2.5V_{dc}$.

The generation of gate pulses for all of the switches of the 11L-BANPC is accomplished by using nearest level control pulse width modulation (NLC-PWM). NLC-PWM uses low switching frequency and is conventionally used where there are a high number of voltage levels.

Figure 3A:
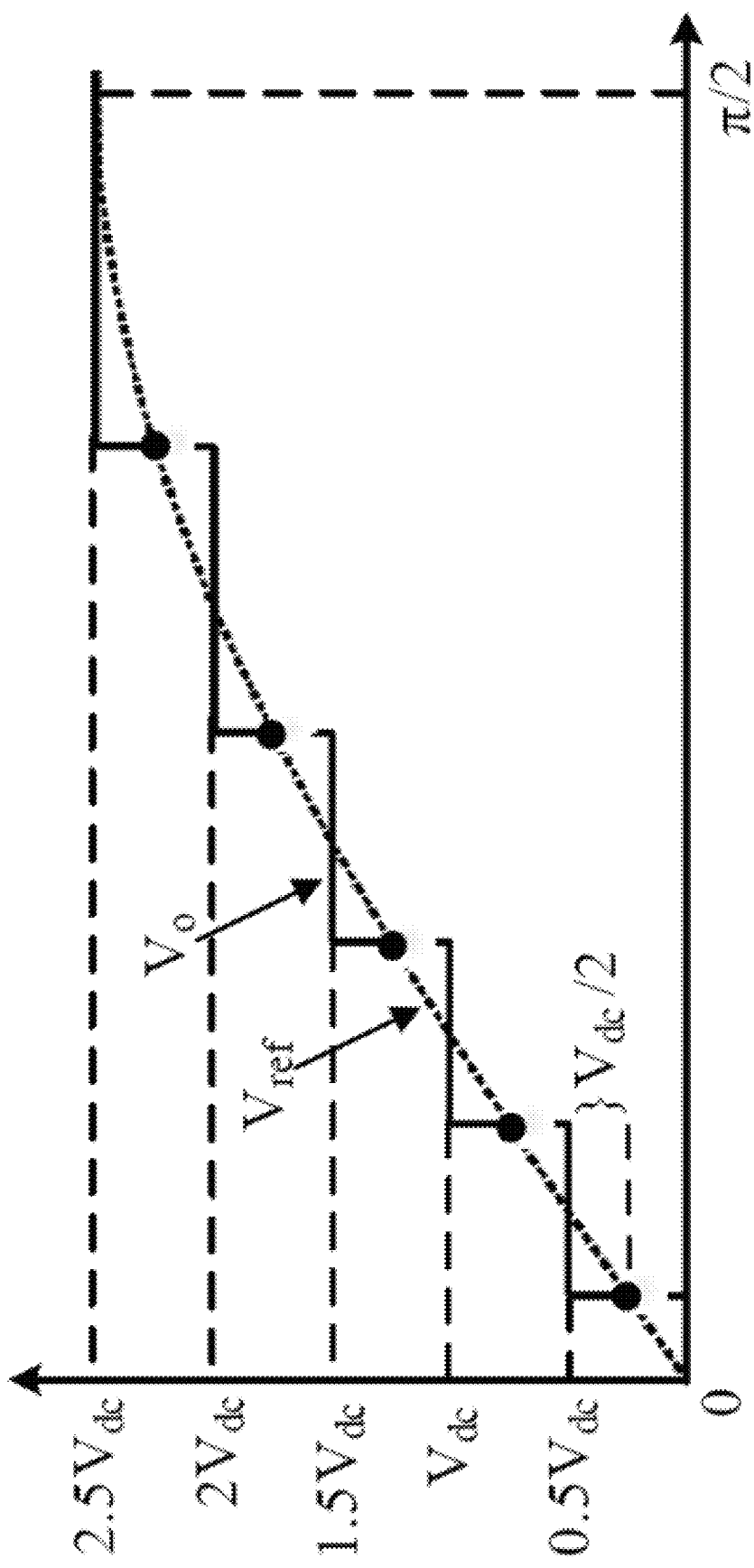
FIGS. 3A-3C illustrate the nearest level control with 3A. a sampled reference signal and 3B. implementation of NLC and 3C. gate pulses.

NLC-PWM for the 11L-BANPC is illustrated in FIG. 3A.

FIG. 3A shows the NLC for a sampled reference signal, $V_{ref}$. The output voltage $V_o$ and the voltage on capacitor $C_1$ of $V_{dc}/2$ are indicated on the graph in NLC-PWM, a sinusoidal reference signal, $V_{ref}$, is compared with the staircase output voltage waveform, $V_o$. The comparison generates the gate pulses which drive the switches based on the switching logic given in Table 1.

Figure 3B:
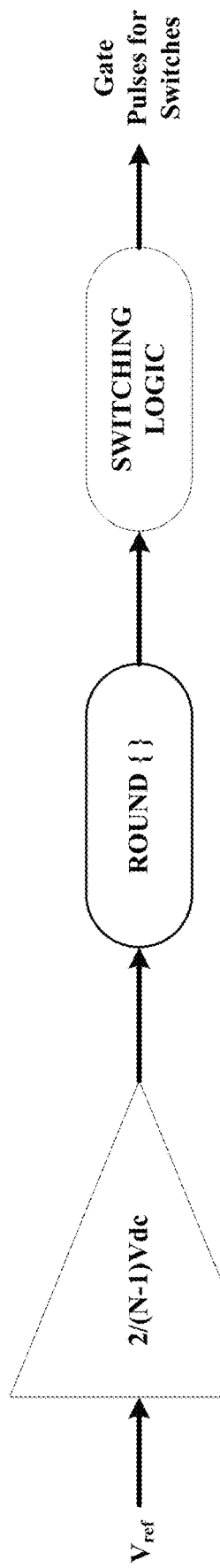

FIG. 3B shows the implementation of the NLC for an N number of levels. The modulation index (MI) can be varied in NLC by changing the reference voltage, $V_{ref}$, and can be defined for N>1 as in equation (1):

$$\text{Modulation Index} = \frac{2V_{ref}}{(N-1)V_{dc}}, \quad (1)$$

where N represents the number of levels and is greater than 1, and $V_{ref}$ is selected as shown in FIG. 3A.

Figure 3C:
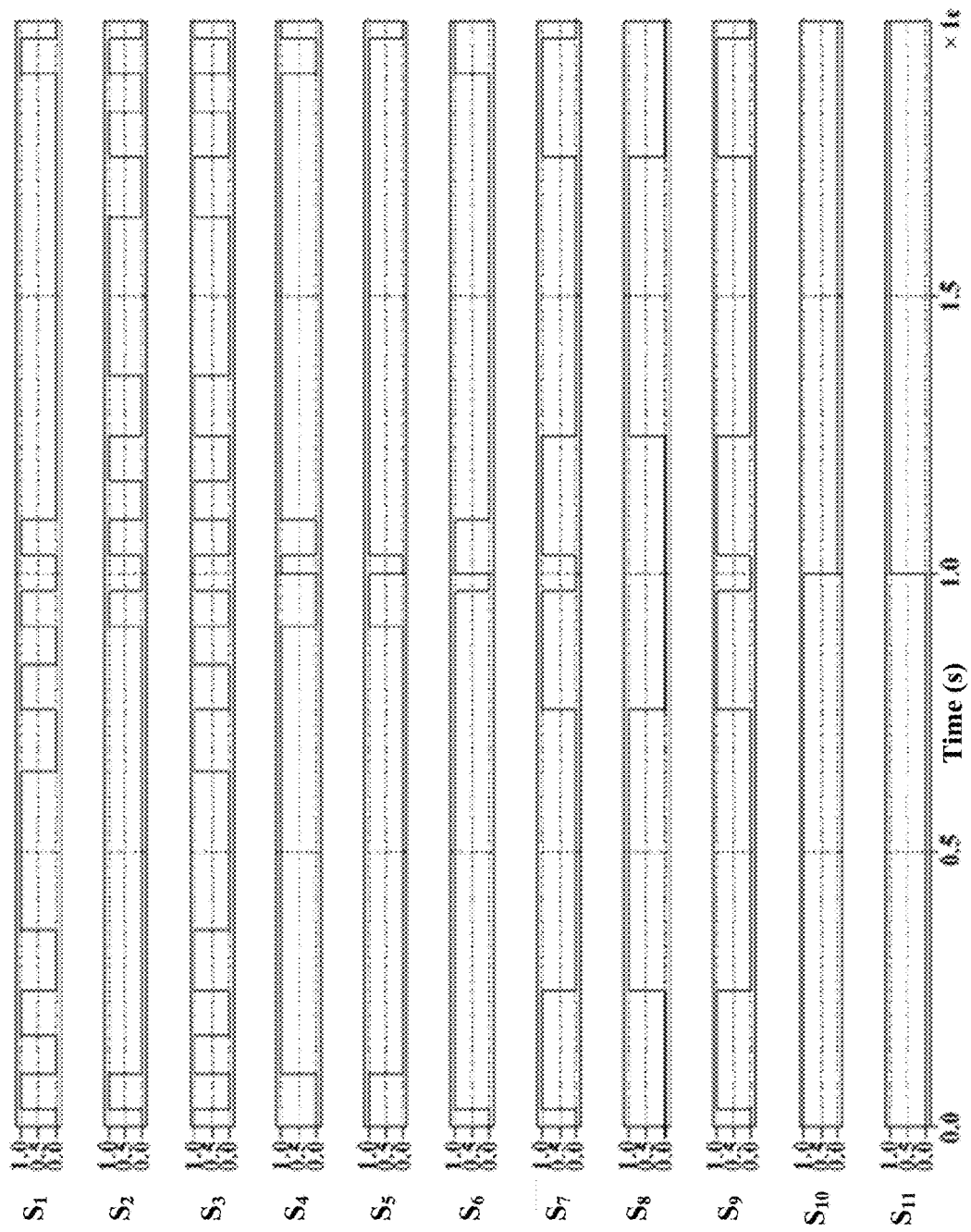

FIG. 3C shows the gate pulses generated by NLC-PWM which are applied to the switches of the 11L-BANPC. The gate pulses for switches S1-S11 are graphed versus time.

The 11L-BANPC was simulated using PLECS software. (See: "PLECS—The Simulation Platform for Power Electronic Systems", https://www.plexim.com/plecs, incorporated herein by reference in its entirety). For the simulation, the magnitude of the input voltage was selected as 100V. Capacitors $C_1$ and $C_2$ were each assigned a capacitance of 2200 µF, and capacitors $C_3$ and $C_4$ each were given a capacitance value of 4700 µF. With a 100V DC input ($V_{dc}$), the two capacitors $C_1$ and $C_2$ split the input voltage source and the voltage magnitude of each capacitor reached 50V as expected theoretically. The capacitors $C_3$ and $C_4$ are the switched capacitors and these two capacitors are charged up to 100V each, which is equal to the input supply voltage of 100V. NLC-PWM was used for the generation of gate pulses.

Figure 4:
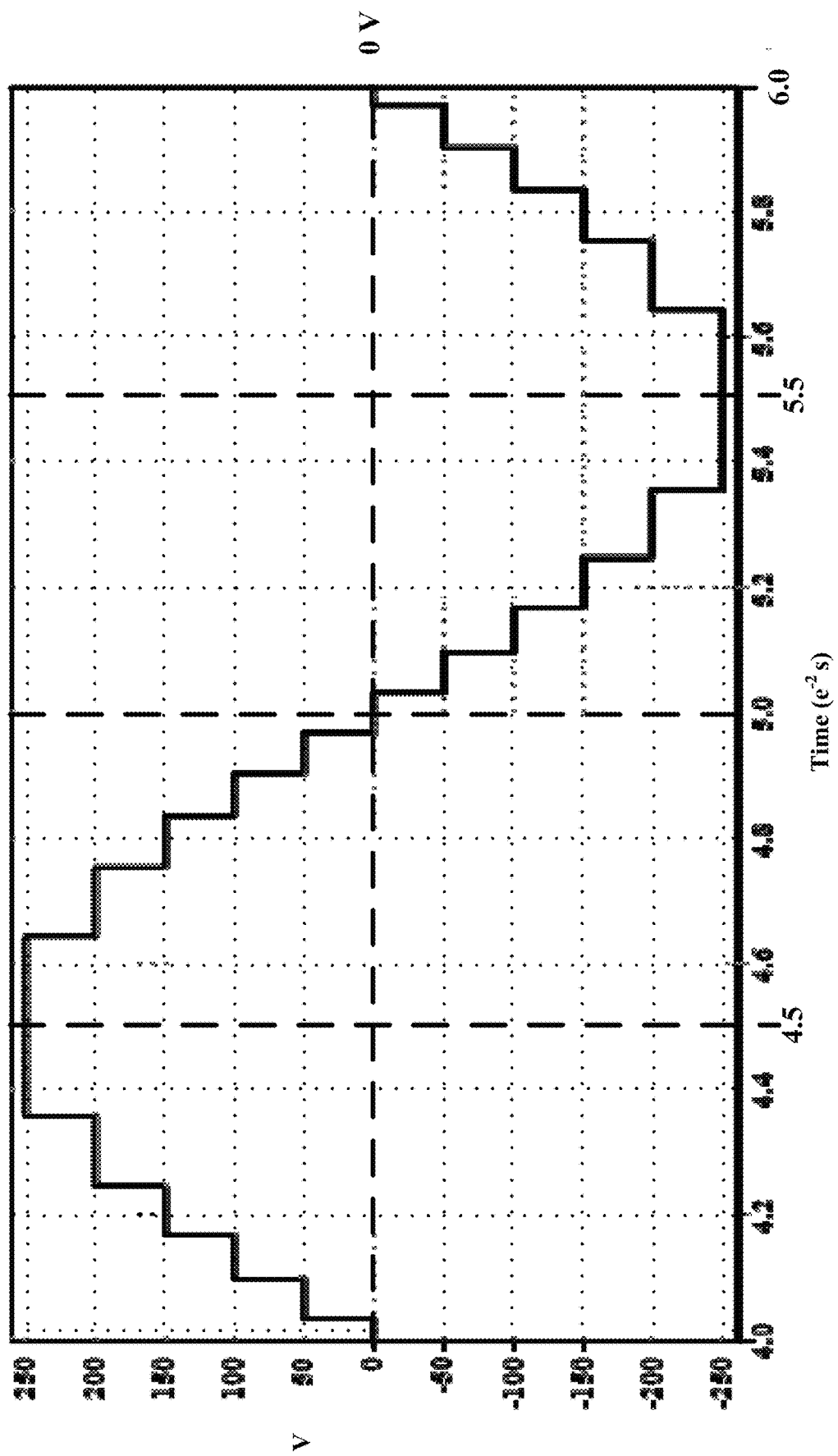
FIG. 4 is a graph illustrating the 11L output voltage waveform.

FIG. 4 shows the simulated 50 Hz step staircase output voltage of the 11L-BANPC of the present disclosure. The 11 level output voltage has a peak magnitude of 250V with the input voltage of 100V, which demonstrates that the input voltage was boosted by 2.5 times.

Figure 5:
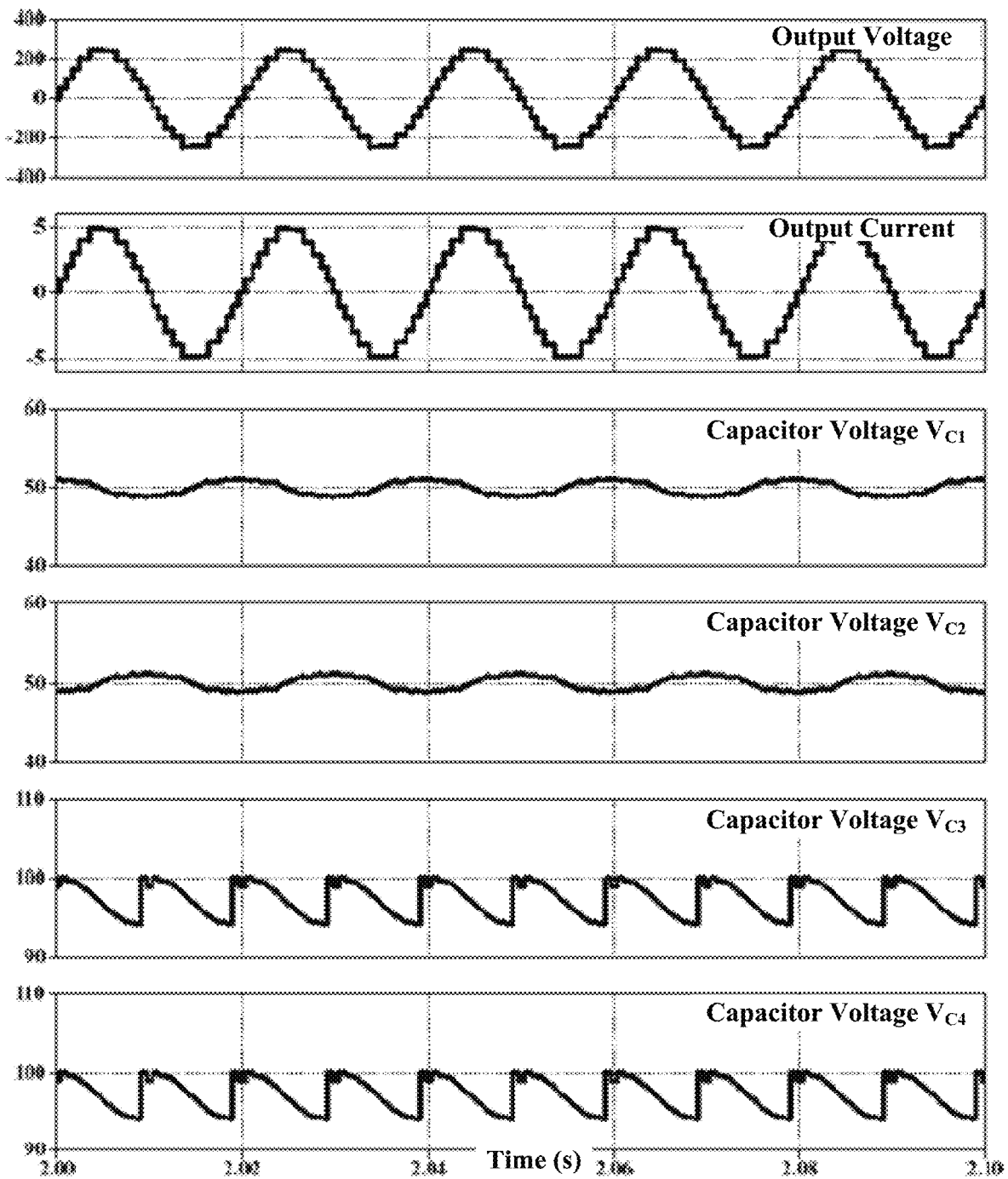
FIG. 5 illustrates simulation results of output voltage, current and capacitor voltages with a purely resistive load.

The 11L-BANPC was validated under different loading conditions. FIG. 5 shows the simulation results of output voltage, load current, and capacitor voltages when a purely resistive load of 50Ω was connected at the load terminals. With a resistive load, the current has an identical waveform to the voltage with a peak of 5A. With a resistive load, the voltages of all the four capacitors were balanced.

Figure 6:
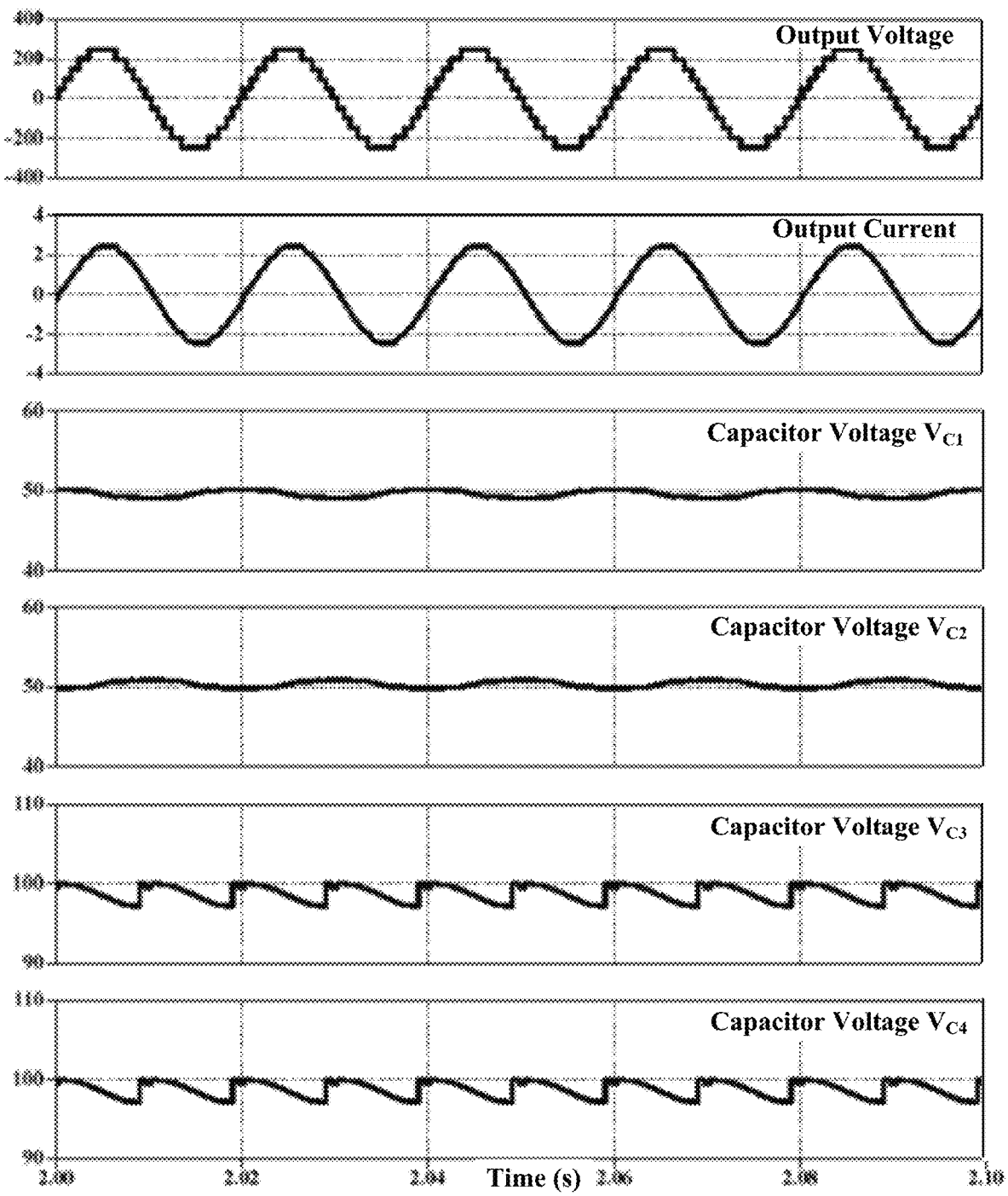
FIG. 6 illustrates simulation results of output voltage, current and capacitor voltages with a series-connected resistive-inductive load.

Similarly, FIG. 6 illustrates the output voltage, current and capacitor voltages with a series-connected resistive-inductive load of 50 mH and 100Ω.

Figure 7:
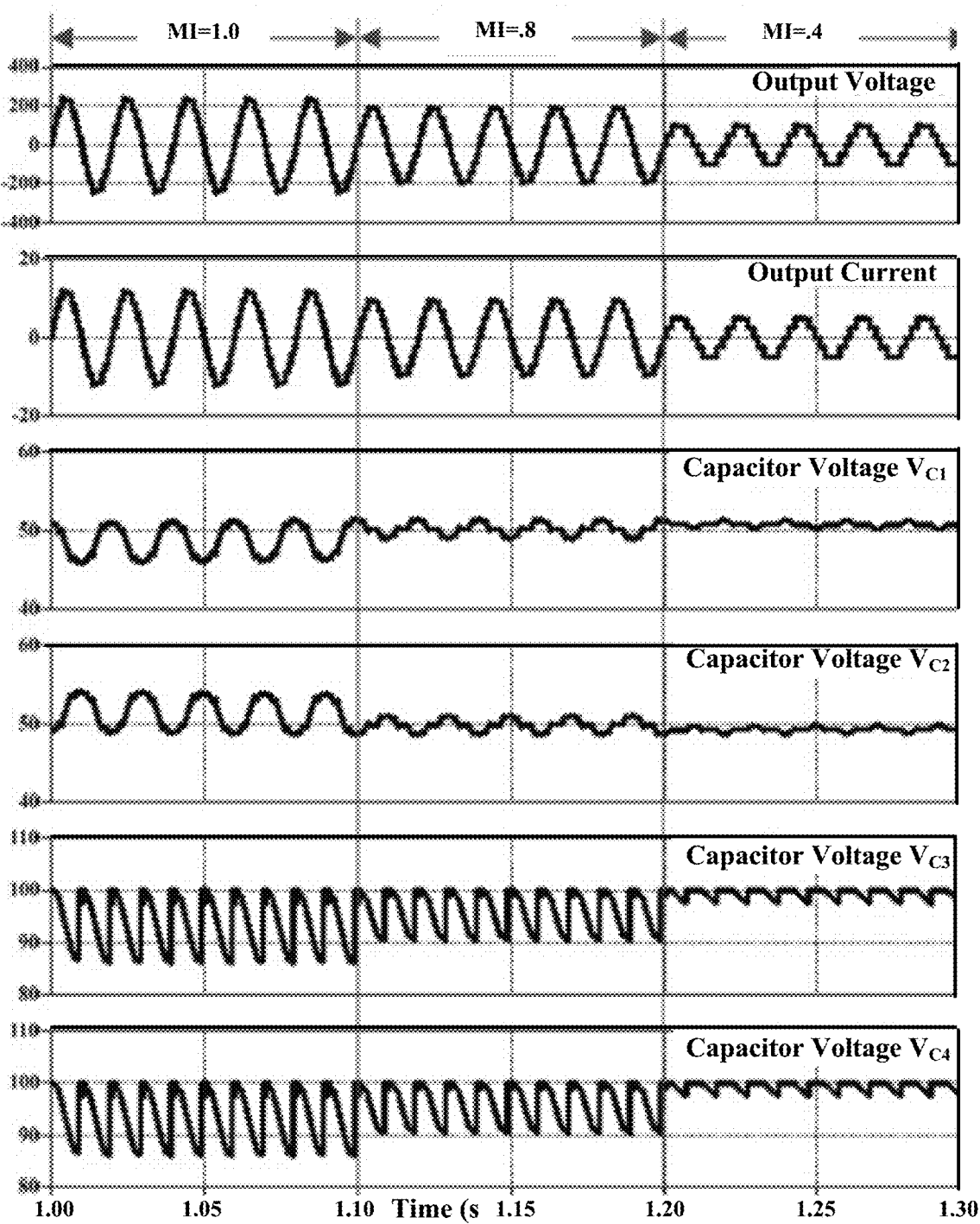
FIG. 7 illustrates the performance of the 11L-BANPC with dynamic MI.

In addition, the modulation index was varied as illustrated in FIG. 7. FIG. 7 shows the manner in which the voltage and current waveforms differ with a change of MI with a resistive load of 20Ω. With MI=1.0, the output voltage has 11 levels, however, as the modulation index is changed from 1.0 to 0.8, the number of levels reduces to 9 from 11. Furthermore, from a change of MI of 0.8 to 0.4, the number of levels reduces from 9 to 5. However, all the capacitor voltages balance regardless of the value of the modulation index.

The first embodiment is illustrated with respect to FIG. 1A-FIG. 11. The first embodiment describes an 11 level boost active neutral point clamped (BANPC) inverter 100, comprising an DC link stage 102 including a DC voltage source, $V_{dc}$, a first capacitor, $C_1$, and a second capacitor, $C_2$, a switching stage 104 connected in parallel with the DC link stage 102, the switching stage 104 including a first plurality of switches ($S_1$-$S_6$) and a first plurality of diodes ($D_1$-$D_4$), an output stage 106 connected in parallel with the switching stage 104, the output stage including a third capacitor, $C_3$, a fourth capacitor, $C_4$, and a second plurality of switches ($S_7$-$S_{11}$), a positive load terminal 107(+) connected to the output stage and a negative load terminal 107(−) connected to a ground (see ground symbol, FIG. 1A), a control circuit 120 operatively connected to the DC voltage source, the first, second, third and fourth capacitors and the first and second plurality of switches, wherein the control circuit is configured to selectively actuate the first and second plurality of switches to balance the first and second capacitors and provide an 11 level output voltage across the load terminals (see eleven levels, FIG. 4).

The 11 level boost active neutral point clamped (BANPC) inverter further includes a second plurality of diodes (diodes of the switches, FIG. 1). The DC voltage source, $V_{dc}$) includes a positive terminal (+) and a negative terminal (−), each capacity or has a positive connector (indicated by a straight line) and a negative connector (indicated by a curved line) and each diode has an anode (indicated by the triangle base of the diode) and a cathode (indicated by the bar on the point of the diode). Each switch includes a transistor having an emitter (E), a collector (C), a gate (G), and a diode (D) selected from the second plurality of diodes, the diode connected antiparallel to the emitter and collector (See FIG. 1B).

The positive terminal of the DC voltage source is connected to a positive connector of the first capacitor ($C_1$) and the negative terminal of the DC voltage source is connected to a negative connector of the second capacitor ($C_2$), and a negative connector of the first capacitor is connected to a positive connector of the second capacitor and to ground.

The first plurality of switches includes a first switch, a second switch, a third switch, a fourth switch, a fifth switch and a sixth switch ($S_1$-$S_6$) and the first plurality of diodes includes a first diode, a second diode, a third diode and a fourth diode ($D_1$-$D_4$).

A collector of the first switch $S_1$ is connected to the positive connector of the first capacitor, an emitter of the third switch $S_3$ is connected to the negative connector of the second capacitor, a cathode of the first diode $D_1$ is connected to ground, an anode of the second diode $D_2$ is connected to ground, an emitter of the second switch $S_2$ is connected to an anode of the first diode and to an anode of the third diode $D_3$, a collector of the second switch is connected to a cathode of the second diode and to a cathode of the fourth diode $D_4$, an anode of the third diode is connected to an emitter of the first switch and to a collector of the fourth switch $S_4$, an anode of the fourth diode is connected to a collector of the third switch and to an emitter of the fourth switch, the emitter of the first switch is connected to an emitter of the fifth switch $S_5$, and the collector of the third switch is connected to a collector of the sixth switch $S_6$.

The second plurality of switches includes a seventh switch, an eighth switch, a ninth switch, a tenth switch and an eleventh switch ($S_7$-$S_{11}$).

A collector of the fifth switch is connected to a collector of the seventh switch $S_7$, a positive connector of the fourth capacitor $C_4$ and to a collector of the tenth switch $S_{10}$, an emitter of the sixth switch is connected to an emitter of the ninth switch $S_9$, a negative connector of the third capacitor $C_3$ and to an emitter of the eleventh switch $S_{11}$, an emitter of the seventh switch $S_7$ is connected to a collector of the eighth switch $S_8$ and to a positive connector of the third capacitor, an emitter of the eighth switch is connected to a negative connector of the fourth capacitor and to a collector of the ninth switch, an emitter of the tenth switch $S_{10}$ and a collector of the eleventh switch $S_{11}$ are connected to the positive load terminal (107(+)) and the negative load terminal (107(−)) is connected to ground.

The control circuit further comprises a modulation circuit (NLC-PWM 122) configured to generate gate pulses (see FIG. 3C) to selectively actuate the switches by nearest level control pulse width modulation (NLC-PWM) in which a modulation index is based on $$\text{Modulation Index} = \frac{2V_{ref}}{(N-1)V_{dc}},$$

where $V_{ref}$ is an adjustable reference voltage, N is the number of voltage levels, N is greater than 1 and $V_{dc}$ is the voltage at the positive terminal of the DC voltage source (See FIG. 3A, 3B, 7).

The control circuit 120 is operatively connected to the gates (G, FIG. 1B) of the first and second plurality of switches, the first, second, third and fourth positive and negative connectors of the capacitors, the positive and negative terminals of the DC voltage source and the first and second load terminals, and the control circuit is configured to selectively provide the gate pulses to the gates of the first and second plurality of switches to generate the 11 level output voltage at the first load terminal.

The second embodiment is illustrated with respect to FIG. 1-11. The second embodiment describes a method for generating 11 output voltage levels with an 11 level boost active neutral point clamped (BANPC) inverter, comprising charging, by a DC voltage source, $V_{dc}$, a first and second series connected capacitor ($C_1$, $C_2$) of a DC link stage 102 of the 11 level BANPC inverter, generating, by a control circuit 120, a plurality of gate pulses using nearest level control pulse width modulation (NLC-PWM, see 122, FIG. 1A), applying the gate pulses to a first ($S_1$-$S_6$) and second plurality of switches ($S_7$-$S_{11}$), wherein the gate pulses balance each of the first and second series connected capacitors to have a same voltage magnitude, wherein applying the gate pulses to the first and second plurality of switches selectively connects a third capacitor, $C_3$, and a fourth capacitor $C_4$, of an output stage of the 11 level BANPC inverter to the DC voltage source and generates an 11 level output voltage at the positive load terminal. 107(+)

The method further includes adjusting a modulation index based on $$\text{Modulation Index} = \frac{2V_{ref}}{(N-1)V_{dc}},$$

where $V_{ref}$ is a selectable reference voltage, N is the number of voltage levels, N is greater than 1 and $V_{dc}$ is the voltage at the positive terminal of the DC voltage source (see FIGS. 3A, 3B and 7).

The method further includes generating a first rising staircase voltage output of zero to $2.5V_{dc}$ (see time 4-4.5 $e^{-2}$ seconds, FIG. 4) by applying, during a first time period, a first set of gate pulses (sets of gate pulses as generated by the switching patterns of FIG. 2A-2F and as shown in Table 1) of the plurality of gate pulses (see gate pulses, FIG. 3C) to the first and second plurality of switches to selectively connect the DC voltage source, $V_{dc}$, and the first and second series connected capacitors to the third and fourth capacitors and generate a voltage output of zero volts at the positive load terminal, applying, during a second time period, a second set of gate pulses of the plurality of gate pulses to the first and second plurality of switches to selectively connect the DC voltage source, $V_{dc}$, and the first and second series connected capacitors to the third and fourth capacitors and generate a voltage output of $0.5V_{dc}$ at the positive load terminal, applying, during a third time period, a third set of gate pulses of the plurality of gate pulses to the first and second plurality of switches to selectively connect the DC voltage source, $V_{dc}$, and the first and second series connected capacitors to the third and fourth capacitors and generate a voltage output of $1.0V_{dc}$ at the positive load terminal, applying, during a fourth time period, a fourth set of gate pulses of the plurality of gate pulses to the first and second plurality of switches to selectively connect the DC voltage source, $V_{dc}$, and the first and second series connected capacitors to the third and fourth capacitors and generate a voltage output of $1.5V_{dc}$ at the positive load terminal, applying, during a fifth time period, a fifth set of gate pulses of the plurality of gate pulses to the first and second plurality of switches to selectively connect the DC voltage source, $V_{dc}$, and the first and second series connected capacitors to the third and fourth capacitors and generate a voltage output of $2.0V_{dc}$ at the positive load terminal, and applying, during a sixth time period, a sixth set of gate pulses of the plurality of gate pulses to the first and second plurality of switches to selectively connect the DC voltage source, $V_{dc}$, and the first and second series connected capacitors to the third and fourth capacitors and generate a voltage output of $2.5V_{dc}$ at the positive load terminal, wherein the first through sixth time periods are successive, equal time periods.

The method further includes generating a first falling staircase voltage output of $2.5V_{dc}$ to zero volts (see time 4.5-5.0 $e^{-2}$ seconds, FIG. 4) by applying, during a seventh time period, the sixth set of gate pulses of the plurality of gate pulses to the first and second plurality of switches to selectively connect the DC voltage source, $V_{dc}$, and the first and second series connected capacitors to the third and fourth capacitors and generate a voltage output of $2.5V_{dc}$ at the positive load terminal, applying, during an eighth time period, the fifth set of gate pulses of the plurality of gate pulses to the first and second plurality of switches to selectively connect the DC voltage source, $V_{dc}$, and the first and second series connected capacitors to the third and fourth capacitors and generate a voltage output of $2.0V_{dc}$ at the positive load terminal, applying, during a ninth time period, the fourth set of gate pulses of the plurality of gate pulses to the first and second plurality of switches to selectively connect the DC voltage source, $V_{dc}$, and the first and second series connected capacitors to the third and fourth capacitors and generate a voltage output of $1.5V_{dc}$ at the positive load terminal, applying, during a tenth time period, the third set of gate pulses of the plurality of gate pulses to the first and second plurality of switches to selectively connect the DC voltage source, $V_{dc}$, and the first and second series connected capacitors to the third and fourth capacitors and generate a voltage output of $1.0V_{dc}$ at the positive load terminal, applying, during an eleventh time period, the second set of gate pulses of the plurality of gate pulses to the first and second plurality of switches to selectively connect the DC voltage source, $V_{dc}$, and the first and second series connected capacitors to the third and fourth capacitors and generate a voltage output of $0.5V_{dc}$ at the positive load terminal, and applying, during a twelfth time period, the first set of gate pulses of the plurality of gate pulses to the first and second plurality of switches to selectively connect the DC voltage source, $V_{dc}$, and the first and second series connected capacitors to the third and fourth capacitors and generate a voltage output of zero volts at the positive load terminal, wherein the seventh through twelfth time periods are successive time periods equal to and successive to the sixth time period.

The method further includes generating a second falling staircase voltage output of $-0.5V_{dc}$ to $-2.5V_{dc}$ (see time 5.0-5.5 $e^{-2}$ seconds, FIG. 4) by applying, during a thirteenth time period, a seventh set of gate pulses of the plurality of gate pulses to the first and second plurality of switches to selectively connect the DC voltage source, $V_{dc}$, and the first and second series connected capacitors to the third and fourth capacitors and generate a voltage output of $-0.5V_{dc}$ at the positive load terminal, applying, during a fourteenth time period, an eighth set of gate pulses of the plurality of gate pulses to the first and second plurality of switches to selectively connect the DC voltage source, $V_{dc}$, and the first and second series connected capacitors to the third and fourth capacitors and generate a voltage output of $-1.0V_{dc}$ at the positive load terminal, applying, during a fifteenth time period, a ninth set of gate pulses of the plurality of gate pulses to the first and second plurality of switches to selectively connect the DC voltage source, $V_{dc}$, and the first and second series connected capacitors to the third and fourth capacitors and generate a voltage output of $-1.5V_{dc}$ at the positive load terminal, applying, during a sixteenth time period, a tenth set of gate pulses of the plurality of gate pulses to the first and second plurality of switches to selectively connect the DC voltage source, $V_{dc}$, and the first and second series connected capacitors to the third and fourth capacitors and generate a voltage output of $-2.0V_{dc}$ at the positive load terminal, and applying, during a seventeenth time period, an eleventh set of gate pulses of the plurality of gate pulses to the first and second plurality of switches to selectively connect the DC voltage source, $V_{dc}$, and the first and second series connected capacitors to the third and fourth capacitors and generate a voltage output of $-2.5V_{dc}$ at the positive load terminal, wherein the thirteenth through seventeenth time periods are successive time periods equal to and successive to the twelfth time period.

The method further includes generating a second rising staircase voltage output of $-2.5V_{dc}$ to zero $V_{dc}$ (see time 5.5-6.0 $e^{-2}$ seconds, FIG. 4) by applying, during an eighteenth time period, the eleventh set of gate pulses of the plurality of gate pulses to the first and second plurality of switches to selectively connect the DC voltage source, $V_{dc}$, and the first and second series connected capacitors to the third and fourth capacitors and generate a voltage output of $-2.5V_{dc}$ at the positive load terminal, applying, during an nineteenth time period, the tenth set of gate pulses of the plurality of gate pulses to the first and second plurality of switches to selectively connect the DC voltage source, $V_{dc}$, and the first and second series connected capacitors to the third and fourth capacitors and generate a voltage output of $-2.0V_{dc}$ at the positive load terminal, applying, during an twentieth time period, the ninth set of gate pulses of the plurality of gate pulses to the first and second plurality of switches to selectively connect the DC voltage source, $V_{dc}$, and the first and second series connected capacitors to the third and fourth capacitors and generate a voltage output of $-1.5V_{dc}$ at the positive load terminal, applying, during a twenty-first time period, the eighth set of gate pulses of the plurality of gate pulses to the first and second plurality of switches to selectively connect the DC voltage source, $V_{dc}$, and the first and second series connected capacitors to the third and fourth capacitors and generate a voltage output of $-1.0V_{dc}$ at the positive load terminal, applying, during a twenty-second time period, the seventh set of gate pulses of the plurality of gate pulses to the first and second plurality of switches to selectively connect the DC voltage source, $V_{dc}$, and the first and second series connected capacitors to the third and fourth capacitors and generate a voltage output of $-0.5V_{dc}$ at the positive load terminal, and applying, during a twenty-third time period, the first set of gate pulses of the plurality of gate pulses to the first and second plurality of switches to selectively connect the DC voltage source, $V_{dc}$, and the first and second series connected capacitors to the third and fourth capacitors and generate a voltage output of zero $V_{dc}$ at the positive load terminal, wherein the eighteenth through twenty-third time periods are successive time periods equal to the seventeenth time period.

The method further includes approximating the voltage output at the positive load terminal for the first through twenty-third time periods (see time 4.0-6.0 e$^{-2}$ seconds, FIG. 4) by a sinusoidal voltage (see dotted line, FIG. 3A), selecting V$_{ref}$ from a voltage level of the sinusoidal voltage for a selected time period, and determining the modulation index for the 11 level boost active neutral point clamped (BANPC) inverter.

The third embodiment is illustrated with respect to FIG. 1-11. The third embodiment describes a non-transitory computer readable medium having instructions stored therein that, when executed by one or more processors, cause the one or more processors (see CPU 801, CPU 803, FIG. 8) to perform a method for generating 11 output voltage levels with an 11 level boost active neutral point clamped (BANPC) inverter, comprising charging, by a DC voltage source, V$_{dc}$, a first and second series connected capacitor (C$_1$, C$_2$) of a DC link stage 102 of the 11 level BANPC inverter, generating, by a control circuit 120, a plurality of gate pulses using nearest level control pulse width modulation (NLC-PWM, see 122, FIG. 1A), applying the gate pulses to a first (S$_1$-S$_6$) and second plurality of switches (S$_7$-S$_{11}$), wherein the gate pulses balance each of the first and second series connected capacitors to have a same voltage magnitude, wherein applying the gate pulses to the first and second plurality of switches selectively connects a third capacitor, C$_3$, and a fourth capacitor C$_4$, of an output stage of the 11 level BANPC inverter to the DC voltage source and generates an 11 level output voltage at the positive load terminal. 107(+)

The non-transitory computer readable medium method further comprises adjusting a modulation index based on $$\text{Modulation Index} = \frac{2V_{ref}}{(N-1)V_{dc}},$$

where V$_{ref}$ is a selectable reference voltage, N is the number of voltage levels, N is greater than 1 and V$_{dc}$ is the voltage at the positive terminal of the DC voltage source (see FIGS. 3A, 3B and 7).

The non-transitory computer readable medium method further comprises generating a first rising staircase voltage output of zero to 2.5V$_{dc}$ (see time 4-4.5 e$^{-2}$ seconds, FIG. 4) at the positive load terminal (107(+), FIG. 1A) by applying, during successive, equal time periods a first set to a sixth set of the plurality of gate pulses to the first and second plurality of switches to selectively connect the DC voltage source, V$_{dc}$, and the first and second series connected capacitors to the third and fourth capacitors, generating a first falling staircase voltage output of 2.5V$_{dc}$ to zero volts (see time 4.5-5.0 e$^{-2}$ seconds, FIG. 4) at the positive load terminal by applying, during successive, equal time periods the sixth set to the first set of the plurality of gate pulses to the first and second plurality of switches to selectively connect the DC voltage source, V$_{dc}$, and the first and second series connected capacitors to the third and fourth capacitors, generating a second falling staircase voltage output of −0.5V$_{dc}$ to −2.5V$_{dc}$ (see time 5.0-5.5 e$^{-2}$ seconds, FIG. 4) at the positive load terminal by applying, during successive, equal time periods a seventh set to an eleventh set of the plurality of gate pulses to the first and second plurality of switches to selectively connect the DC voltage source, V$_{dc}$, and the first and second series connected capacitors to the third and fourth capacitors, generating a second rising staircase voltage output of −2.5V$_{dc}$ to −0.5V$_{dc}$ (see time 5.5-~5.9 e$^{-2}$ seconds, FIG. 4) at the positive load terminal by applying, during successive, equal time periods the eleventh set to the seventh set of the plurality of gate pulses to the first and second plurality of switches to selectively connect the DC voltage source, V$_{dc}$, and the first and second series connected capacitors to the third and fourth capacitors, and generating a voltage output of zero volts (see time ~5.9 to 6.0 e$^{-2}$ seconds, FIG. 4) at the positive load terminal by applying the first set of the plurality of gate pulses to the first and second plurality of switches to selectively connect the DC voltage source, V$_{dc}$, and the first and second series connected capacitors to the third and fourth capacitors.

The non-transitory computer readable medium method further comprises approximating the voltage output at the positive load terminal for the first rising staircase voltage output of zero to 2.5V$_{dc}$, the first falling staircase voltage output of 2.5V$_{dc}$ to zero volts, the second falling staircase voltage output of −0.5V$_{dc}$ to −2.5V$_{dc}$, the second rising staircase voltage output of −2.5V$_{dc}$ to −0.5V$_{dc}$ and the voltage output of zero voltage by a sinusoidal voltage, selecting V$_{ref}$ from a voltage level of the sinusoidal voltage for a selected time period, and determining the modulation index for the 11 level boost active neutral point clamped (BANPC) inverter.

Figure 8:
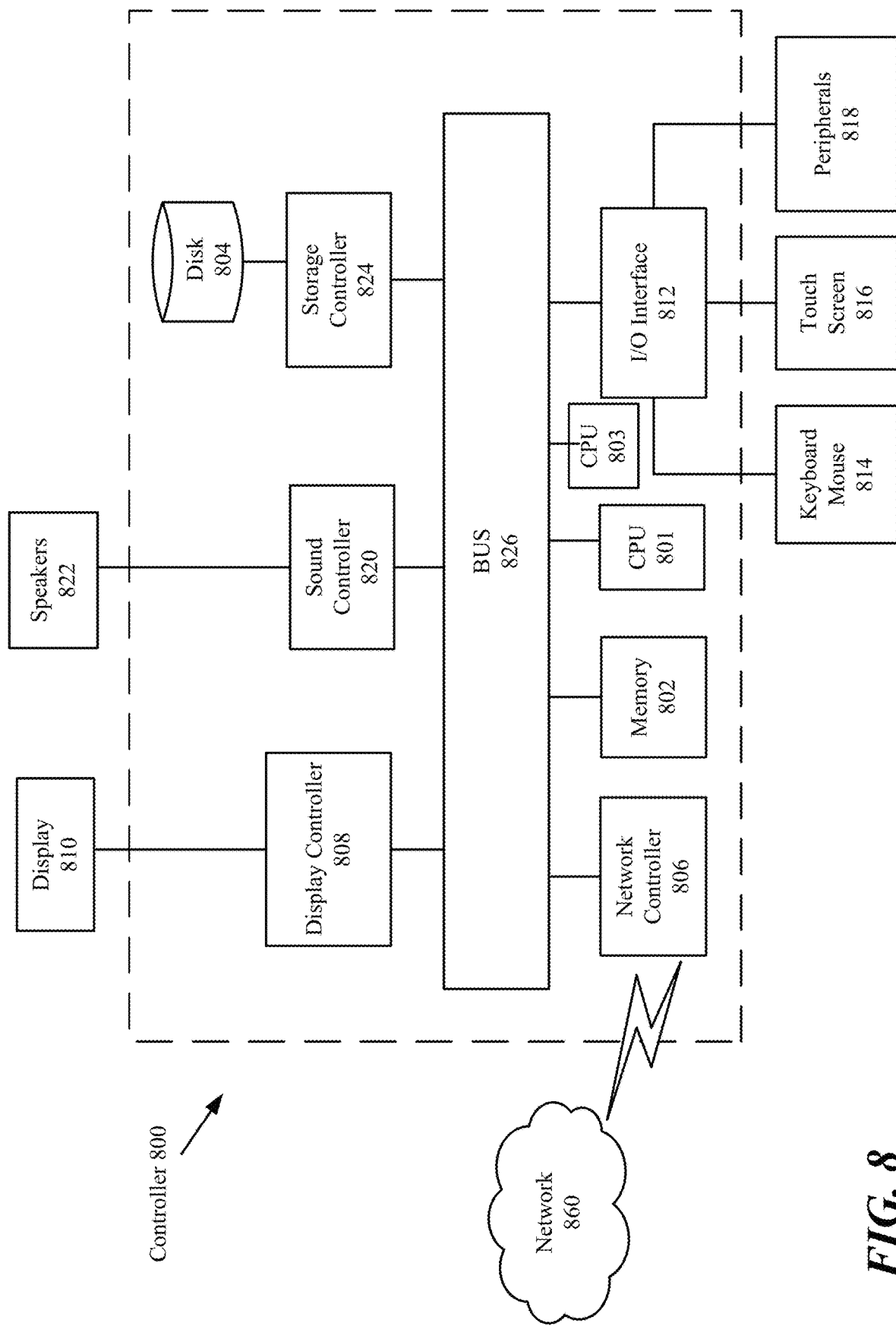
FIG. 8 is an illustration of a non-limiting example of details of computing hardware used in the computing system, according to certain embodiments.

Next, further details of the hardware description of the computing environment of FIG. 1 according to exemplary embodiments are described with reference to FIG. 8. In FIG. 8, a controller 800 is described is representative of the control circuit 120 of FIG. 1 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 808, such as a NVIDIA GeForce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 816 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
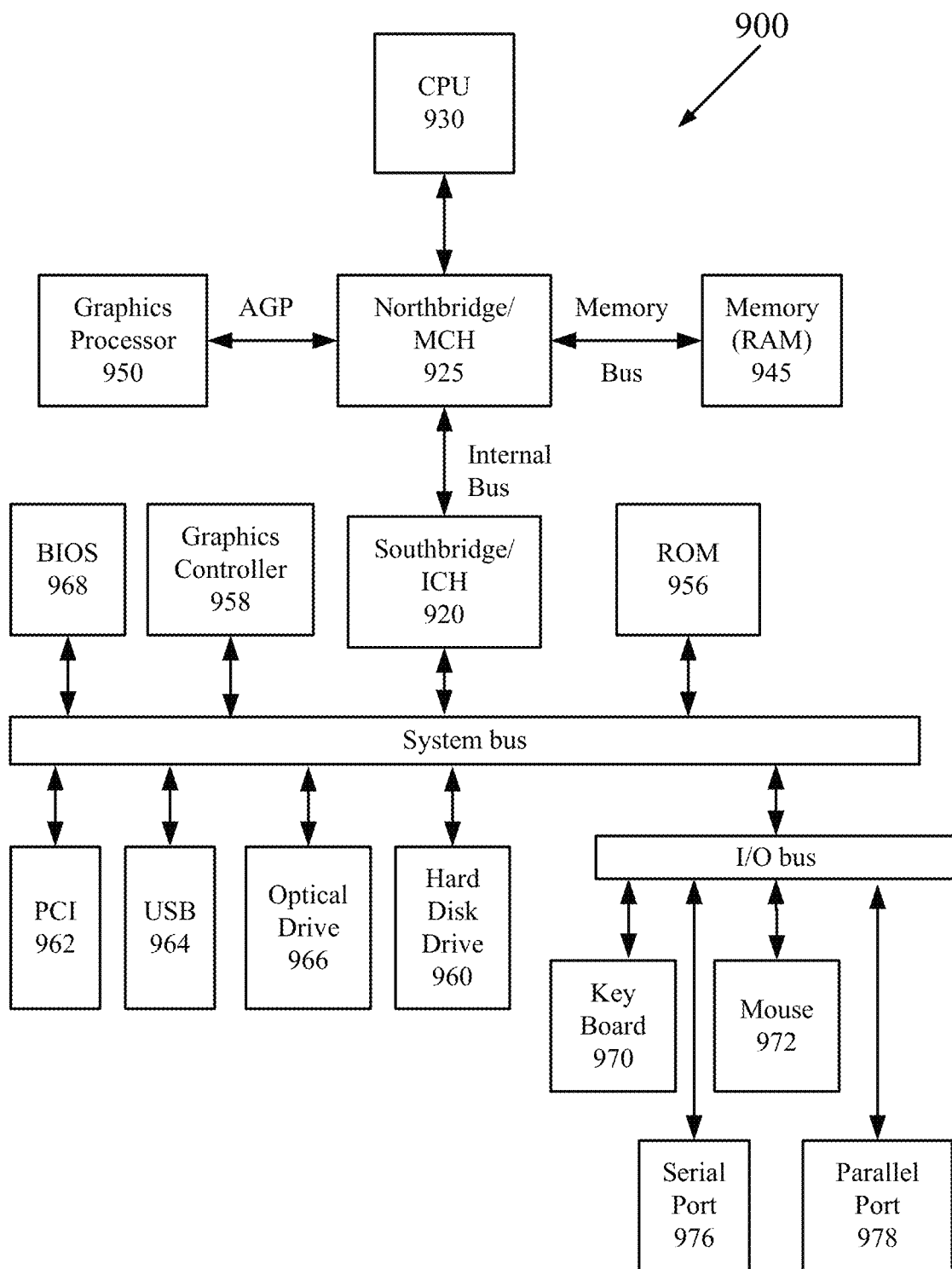
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus, and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
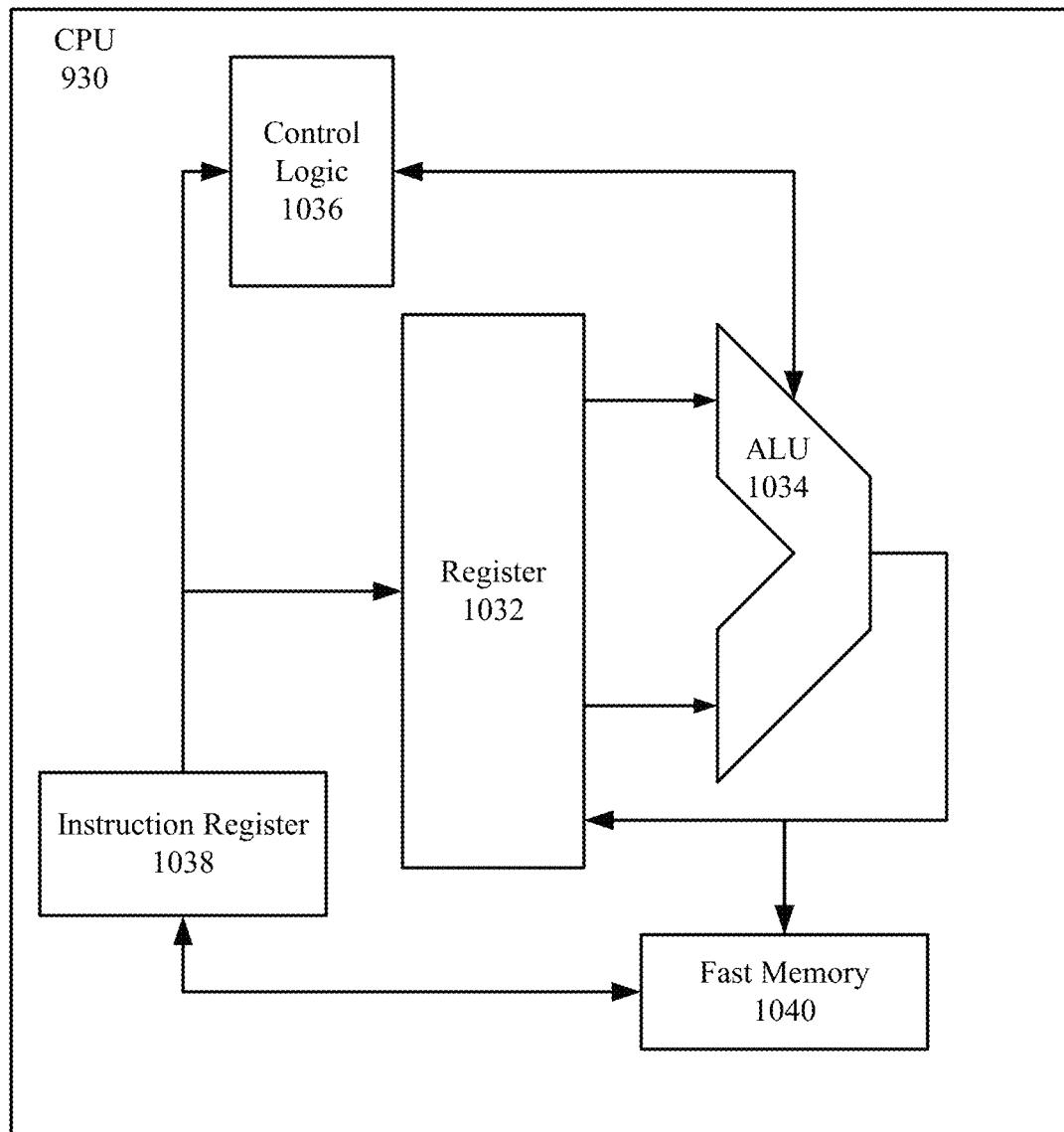
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 1030. Part of the instructions can also be directed to the register 1032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be feedback into the register and/or stored in the fast memory 1040. According to certain implementations, the instruction set architecture of the CPU 930 can use a reduced instruction set architecture, a complex instruction set architecture, a vector processor architecture, a very large instruction word architecture. Furthermore, the CPU 930 can be based on the Von Neuman model or the Harvard model. The CPU 930 can be a digital signal processor, an FPGA, an ASIC, a PLA, a PLD, or a CPLD. Further, the CPU 930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 988 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 11:
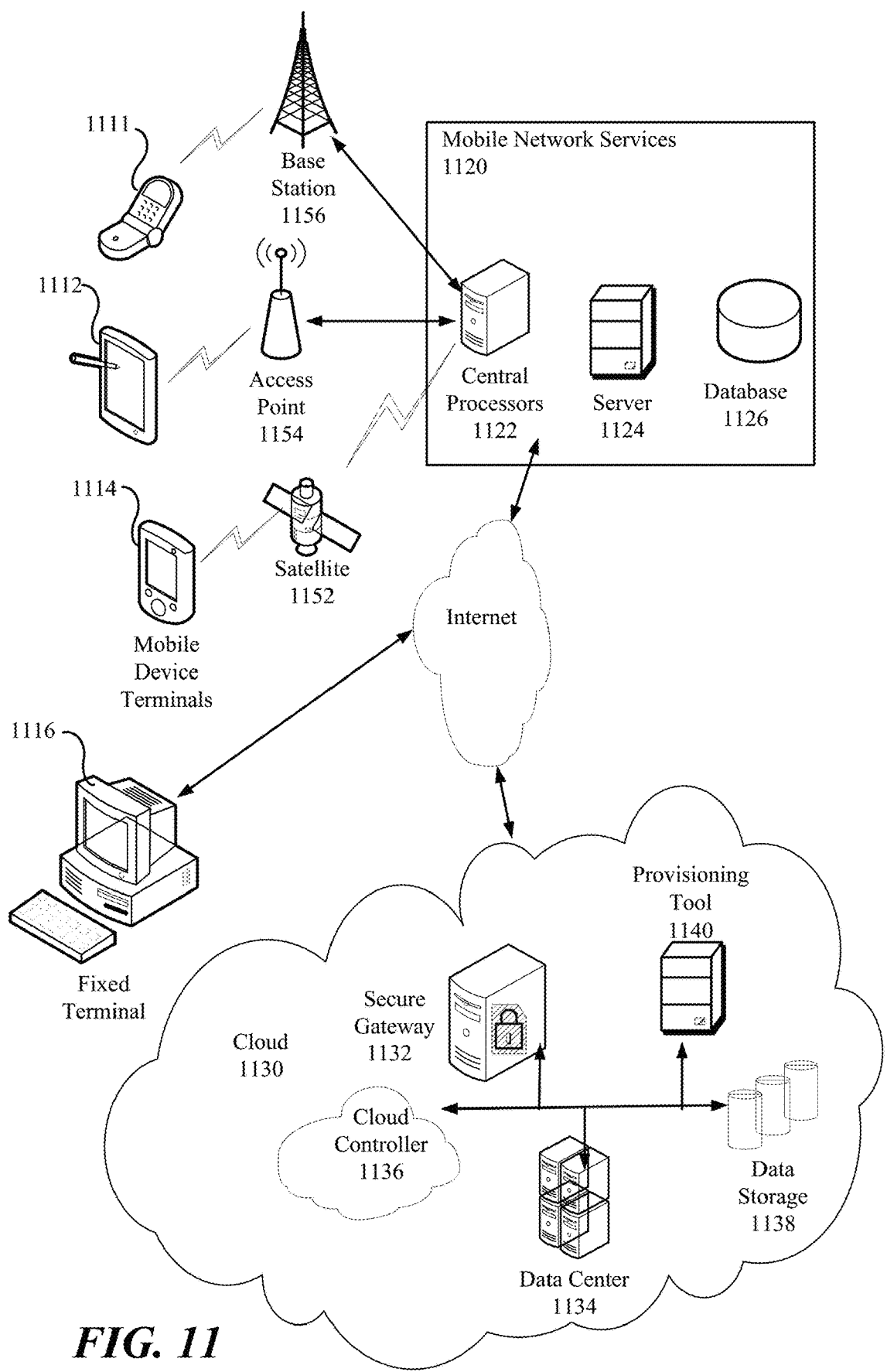
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 11, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An 11-level boost active neutral point clamped (BANPC) inverter, comprising:
a DC link stage including a DC voltage source having a positive terminal and a negative terminal, a first capacitor and a second capacitor,
a switching stage connected in parallel with the DC link stage, the switching stage including a first plurality of switches, a first plurality of diodes, and a second plurality of diodes, wherein the first plurality of switches includes a first switch, a second switch, a third switch, a fourth switch, a fifth switch and a sixth switch, and the first plurality of diodes includes a first diode, a second diode, a third diode and a fourth diode;
an output stage connected in parallel with the switching stage, the output stage including a third capacitor, a fourth capacitor and a second plurality of switches, wherein the second plurality of switches includes a seventh switch, an eighth switch, a ninth switch, a tenth switch and an eleventh switch;
a positive load terminal connected to the output stage and a negative load terminal connected to a ground; and
a control circuit operatively connected to the DC voltage source, the first, second, third and fourth capacitors and the first and second plurality of switches, wherein the control circuit is configured to selectively actuate the first and second plurality of switches to balance voltage across the first and second capacitors and provide an 11-level output voltage across the positive and negative load terminals,
wherein each of the first, second, third, and fourth capacitors has a positive connector and a negative connector,
wherein each of the diodes of the first and second plurality of diodes has an anode and a cathode,
wherein each switch of the first and second plurality of switches includes:
a transistor having an emitter, a collector, and a gate; and
an antiparallel diode, selected from the second plurality of diodes, the antiparallel diode connected between the emitter and the collector of the transistor;
wherein each of the first, second, third, and fourth capacitors is an electrolytic capacitor selected from the group consisting of an aluminum electrolytic capacitor, a tantalum electrolytic capacitor, and a niobium electrolytic capacitor;
wherein the positive terminal of the DC voltage source is connected to the positive connector of the first capacitor, and the negative terminal of the DC voltage source is connected to the negative connector of the second capacitor;
wherein the negative connector of the first capacitor is connected to the positive connector of the second capacitor and to the ground;
wherein the collector of the first switch is connected to the positive connector of the first capacitor;
wherein the emitter of the third switch is connected to the negative connector of the second capacitor;
wherein the cathode of the first diode is connected to the ground;
wherein the anode of the second diode is connected to the ground;
wherein the emitter of the second switch is connected to the anode of the first diode and to the anode of the third diode;
wherein the collector of the second switch is connected to the cathode of the second diode and to the cathode of the fourth diode;
wherein the cathode of the third diode is connected to the emitter of the first switch and to the collector of the fourth switch;
wherein the anode of the fourth diode is connected to the collector of the third switch and to the emitter of the fourth switch;
wherein the emitter of the first switch is connected to the emitter of the fifth switch;
wherein the collector of the third switch is connected to the collector of the sixth switch;
wherein the collector of the fifth switch is connected to the collector of the seventh switch, the positive connector of the fourth capacitor and to the collector of the tenth switch; and
wherein the emitter of the sixth switch is connected to the emitter of the ninth switch, the negative connector of the third capacitor and to the emitter of the eleventh switch.

2. The 11-level boost active neutral point clamped (BANPC) inverter of claim 1,
wherein the emitter of the seventh switch is connected to the collector of the eighth switch and to the positive connector of the third capacitor;
wherein the emitter of the eighth switch is connected to the negative connector of the fourth capacitor and to the collector of the ninth switch;
wherein the emitter of the tenth switch and the collector of the eleventh switch are connected to the positive load terminal; and
wherein the negative load terminal is connected to the ground.

3. The 11-level boost active neutral point clamped (BANPC) inverter of claim 2, wherein the control circuit further comprises:
a modulation circuit configured to generate gate pulses to selectively actuate the first and second plurality of switches by nearest level control pulse width modulation (NLC-PWM) in which a modulation index is based on:

$$\text{Modulation Index} = \frac{2V_{ref}}{(N-1)V_{dc}},$$

where Vref is an adjustable reference voltage, N is the number of voltage levels and N is greater than 1 and Vdc is the voltage at the positive terminal of the DC voltage source.

4. The 11-level boost active neutral point clamped (BANPC) inverter of claim 3, wherein the control circuit is operatively connected to the gates of the first and second plurality of switches, the positive and negative connectors of the first, second, third and fourth capacitors, the positive and negative terminals of the DC voltage source and to the positive and negative load terminals; and wherein control circuit is configured to selectively provide the gate pulses to the gates of the first and second plurality of switches to generate the 11-level output voltage across the positive and negative load terminals.

\* \* \* \* \*